United States Patent
Doria et al.

(10) Patent No.: US 11,867,819 B2
(45) Date of Patent: *Jan. 9, 2024

(54) AUTOMATIC POSITIONING OF 2D IMAGE SIGN SIGHTINGS IN 3D SPACE

(71) Applicant: HERE Global B.V., Eindhoven (NL)

(72) Inventors: David Doria, Oak Park, IL (US);
Charles Morcom, Chicago, IL (US);
Engin Burak Anil, Mount Prospect, IL (US); Fangning He, Chicago, IL (US);
Matthew Emery Goss, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 233 days.

This patent is subject to a terminal disclaimer.

(21) Appl. No.: 17/344,297

(22) Filed: Jun. 10, 2021

(65) Prior Publication Data
US 2021/0303884 A1    Sep. 30, 2021

Related U.S. Application Data

(63) Continuation of application No. 16/223,679, filed on Dec. 18, 2018, now Pat. No. 11,055,546.

(51) Int. Cl.
*G06T 7/11* (2017.01)
*G06V 20/58* (2022.01)
(Continued)

(52) U.S. Cl.
CPC ............. *G01S 17/931* (2020.01); *G06T 7/11* (2017.01); *G06V 10/803* (2022.01);
(Continued)

(58) Field of Classification Search
CPC ...... G01S 17/931; G01S 7/4802; G01S 17/89; G06T 7/11; G06T 2207/10028;
(Continued)

(56) References Cited

U.S. PATENT DOCUMENTS

| 11,055,546 B2 * | 7/2021 | Doria ........................ G06T 7/11 |
| 2014/0136098 A1 | 5/2014 | Stroila |

(Continued)

OTHER PUBLICATIONS

European Office Action from Patent Application No. 19217361.5-1207, dated Mar. 14, 2022, 7 pages.

(Continued)

*Primary Examiner* — Jon Chang
(74) *Attorney, Agent, or Firm* — Lempia Summerfield Katz LLC

(57) ABSTRACT

An apparatus for sign detection includes a point cloud analysis module, an image analysis module, a frustum comparison module, and a sign detector. The point cloud analysis module is configured to receive point cloud data associated with a geographic region and classify at least one point neighborhood in the point cloud data as planar and a sign position candidate. The image analysis module is configured to receive image data associated with the geographic region and calculate a sighting frustum from the image data. The frustum comparison module is configured to perform a comparison of the sighting frustum to the sign position candidate having at least one point neighborhood classified as planar. The sign detector is configured to provide a location for the sign detection in response to the comparison of the sighting frustum to the sign position candidate.

20 Claims, 15 Drawing Sheets

(51) Int. Cl.
| | |
|---|---|
| *G01S 17/931* | (2020.01) |
| *G06V 20/56* | (2022.01) |
| *G06V 10/80* | (2022.01) |
| G01S 17/89 | (2020.01) |
| G01S 7/48 | (2006.01) |
| G06F 18/25 | (2023.01) |

(52) U.S. Cl.
CPC .......... *G06V 20/582* (2022.01); *G06V 20/588* (2022.01); *G01S 7/4802* (2013.01); *G01S 17/89* (2013.01); *G06F 18/251* (2023.01); *G06T 2207/10028* (2013.01); *G06T 2207/20112* (2013.01); *G06T 2207/30252* (2013.01); *G06V 2201/12* (2022.01)

(58) Field of Classification Search
CPC .......... G06T 2207/20112; G06T 2207/30252; G06V 10/803; G06V 20/582; G06V 20/588; G06V 2201/12; G06F 18/251
See application file for complete search history.

(56) References Cited

U.S. PATENT DOCUMENTS

| | | | |
|---|---|---|---|
| 2015/0138310 | A1 | 5/2015 | Fan et al. |
| 2018/0188060 | A1 | 7/2018 | Wheeler et al. |
| 2018/0307924 | A1 | 10/2018 | Zeng |
| 2019/0147257 | A1* | 5/2019 | Lindemann .......... G06V 20/582 382/103 |
| 2020/0125845 | A1 | 4/2020 | Hess et al. |
| 2020/0160487 | A1 | 5/2020 | Kanzawa et al. |

OTHER PUBLICATIONS

Balali, Vahid, Armin Ashouri Rad, and Mani Golparvar-Fard. "Detection, classification, and mapping of US traffic signs using google street view images for roadway inventory management." Visualization in Engineering 3.1 (2015): 15.

Balali, Vahid, Elizabeth Depwe, and Mani Golparvar-Fard. "Multiclass traffic sign detection and classification using google street view images." Transportation Research Board 94th Annual Meeting, Transportation Research Board, Washington, DC. 2015.

European Search Report for European Patent Application No. 19217361.5—1207 dated May 7, 2020.

Housel, Bryan. "Fast Traffic Sign Mapping with OpenStreetMap and Mapillary." Points of Interest, Points of Interest, Jul. 31, 2017, blog.mapbox.com/fast-traffic-sign-mapping-with-openstreetmap-and-mapillary-9914943460fc.

Kontschieder, peter. "Mapillary Now Able to Recognize and Label Objects in the Wild." The Mapillary Blog, Sep. 27, 2016, blog.mapillary.com/update/2016/09/27/semantic-segmentation-object-recognition.html.

Li, Y. H., et al. "Road Signs Detection and Recognition Utilizing Images and 3d Point Cloud Acquired by Mobile Mapping System." International Archives of the Photogrammetry, Remote Sensing & Spatial Information Sciences 41 (2016).

Li, Y., et al. "Lidar-Incorporated Traffic Sign Detection From Video Log Images of Mobile Mapping System." International Archives of the Photogrammetry, Remote Sensing & Spatial Information Sciences 41 (2016).

Qi, Charles R., et al. "Frustum pointnets for 3d object detection from rgb-d data." arXiv preprint arXiv:1711.08488 (2017).

Quinlan et al. "Road Sign Detection in Autonomous Vehicles." Velodyne LiDAR, velodynelidar.com/lidar/hdlpressroom/pdf/Articles/Road Sign Detection in Autonomous Vehicles.pdf. (2018).

Weinmann, Martin, et al. "Semantic Point Cloud Interpretation Based on Optimal Neighborhoods, Relevant Features and Efficient Classifiers." ISPRS Journal of Photogrammetry and Remote Sensing, vol. 105. Feb. 27, 2015. (pp. 286-304).

Wen et al. "Spatial-Related Traffic Sign Inspection for Inventory Purposes Using Mobile Laser Scanning Data." IEEE Transactions on Intelligent Transportation Systems, vol. 17, No. 1, Jan. 2016, pp. 27-37 (Year: 2016).

Zhou, Lipu, and Zhidong Deng. "LIDAR and vision-based real-time traffic sign detection and recognition algorithm for intelligent vehicle." Intelligent Transportation Systems (ITSC), 2014 IEEE 17th International Conference on. IEEE, 2014.

Zhou, Lipu, et al. "Perspective Distortion Rectification for Planar Object Based on LIDAR and Camera Data Fusion." 17th International IEEE Conference on Intelligent Transportation Systems (ITSC). IEEE, Oct. 8, 2014. (pp. 270-275).

* cited by examiner

AUTOMATIC POSITIONING OF 2D IMAGE SIGN SIGHTINGS IN 3D SPACE

CROSS REFERENCE TO RELATED APPLICATION

This application is a continuation under 37 C.F.R. § 1.53(b) and 35 U.S.C. § 120 of U.S. patent application Ser. No. 16/223,679 filed Dec. 18, 2018 which is hereby incorporated by reference in its entirety.

FIELD

The following disclosure relates to the detection of road signs, and more particularly to the detection of road signs in an image based on a joint analysis of the image and associated point cloud.

BACKGROUND

Object detection is an important task in computer vision for computers to analyze the world surrounding a roadway and make reactions and determinations. Object detection is impactful in applications such as automatic driving and localization.

One important object in the world surrounding a roadway is a road sign. Road signs include driving restrictions such as speed limits, turn warnings, and overhead clearance warnings. Road signs include point of interest information for business, towns, and other destinations. Road signs include navigational information including details of intersections, exits, and road names.

Because road signs take many shapes and size, as well as orientations and distances from the roadway, road signs may be difficult to accurately detect and identify. The false positives from other similarly shaped objects such as vehicles, bridges, and buildings further impede the detection and identification of road signs.

The following embodiments present improved techniques for the detection and identification of signs.

SUMMARY

In one embodiment, a method for sign detection in a three-dimensional point cloud and a two-dimensional image includes receiving point cloud data associated with a geographic region, classifying at least one point neighborhood in the point cloud data as linear, planar, or volumetric, selecting at least one point neighborhood classified as planar as a sign position candidate, receiving image data associated with the geographic region, calculating a sighting frustum from the image data, performing a comparison of the sighting frustum to the sign position candidate having at least one point neighborhood classified as planar, and providing a location for the sign detection in response to the comparison.

In another embodiment, an apparatus for sign detection in a three-dimensional point cloud and a two-dimensional image includes a point cloud analysis module, an image analysis module, a frustum comparison module, and a sign detector. The point cloud analysis module is configured to receive point cloud data associated with a geographic region and classify at least one point neighborhood in the point cloud data as planar and a sign position candidate. The image analysis module is configured to receive image data associated with the geographic region and calculate a sighting frustum from the image data. The frustum comparison module is configured to perform a comparison of the sighting frustum to the sign position candidate having at least one point neighborhood classified as planar. The sign detector is configured to provide a location for the sign detection in response to the comparison of the sighting frustum to the sign position candidate.

In another embodiment, a non-transitory computer readable medium includes instructions that when executed by a processer are configured to perform receiving point cloud data associated with a geographic region, receiving image data associated with the geographic region, performing a comparison of the point cloud data to the image data to identify a plurality of association sets, determining a focal overlap value for each of the plurality of association sets, ranking the plurality of association sets based on focal overlap value, and selecting a location for sign detection from the ranking of the plurality of association sets.

BRIEF DESCRIPTION OF THE DRAWINGS

Exemplary embodiments of the present invention are described herein with reference to the following drawings.

DETAILED DESCRIPTION

Figure 1:
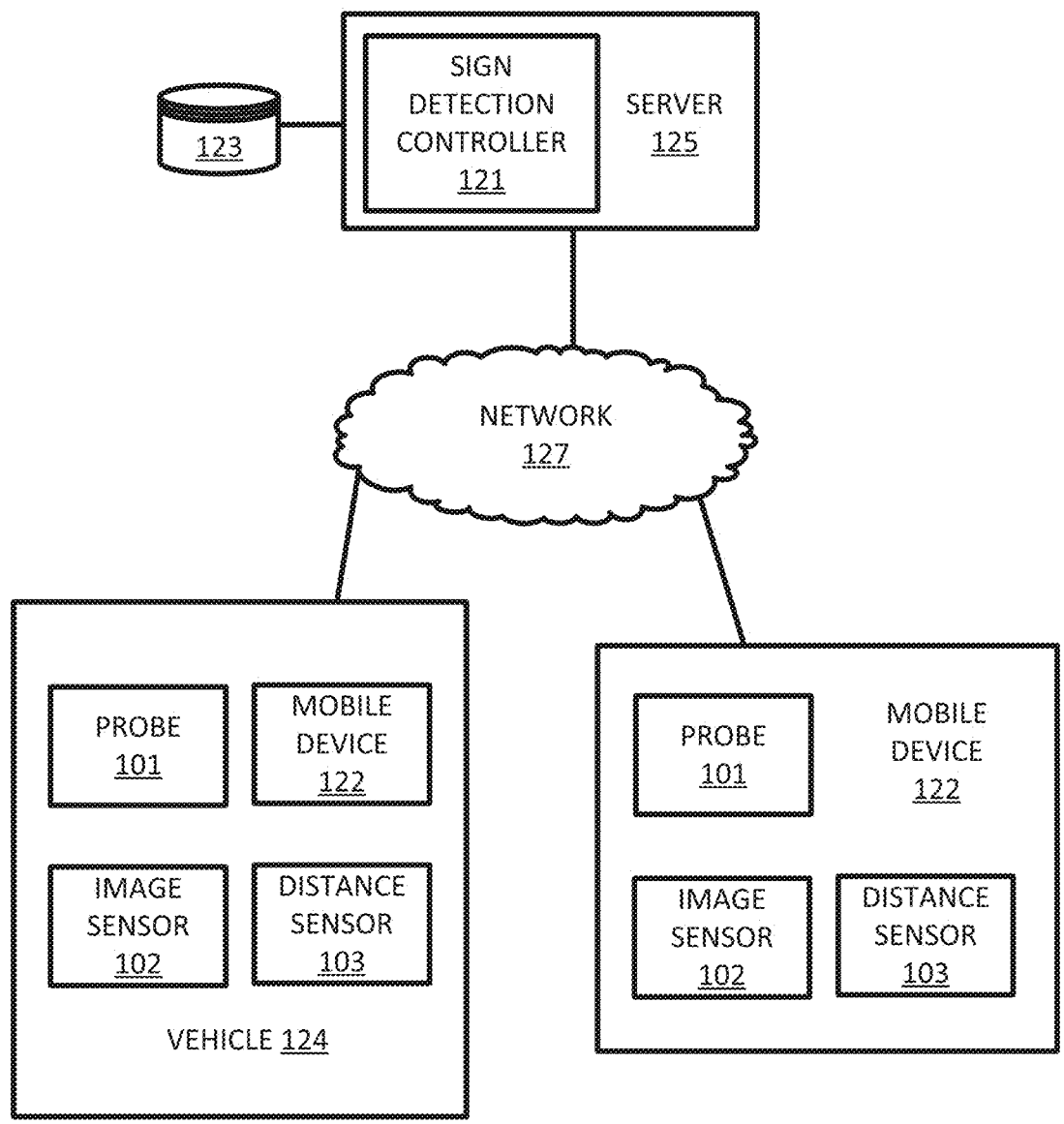
FIG. 1 illustrates an example system for sign detection.

Street images are images collected from the perspective of a roadway or another path. While driving, the human vision system effortlessly identifies everything in the field of vision ranging from roads, sidewalks, pedestrians, traffic-lights, signs, and other features or objects. However, discerning these objects or features from camera-captured images by a computer is quite a complex task. There may be thousands of sign types and several variations of the same sign type in different countries. Additionally, other signs such as non-traffic signs are common. These factors may lead to false positives.

Street images may be used in a variety of technologies. For example, identified signs or other objects may be applied to autonomous driving systems or assisted driving systems. The autonomous driving systems may generate driving commands in response to the signs or other objects. The assisted driving systems may generate driver warnings or supplemental assistance commands in response to the signs or other objects. Localization also may also be performed in response to the identified signs or other objects. For example, the location of a user or vehicle may be determined according to the known location of objects detected in the vicinity of the user or vehicle. Finally, the identified signs or other objects from the side images may be applied to three-dimensional models and mapping database.

The following embodiments detect and identify signs through the combination of a two-dimensional (2D) image and a three-dimensional (3D) point cloud. The system may first analyze the point cloud to find potential planar locations ("position candidates") in 3D space. Then, the system analyzes rectangular regions in 2D camera images to identify signs. From the camera configuration, the system calculates the frustum of possible points in 3D space which could be associated with the 2D image region. Then the sighting frustums and position candidates are intersected to find potential sign positions in 3D space. Next, the association the system selects the one or more intersections of the frustum and the position candidate, which may be based on the quality and degree of overlap. Finally, these best associations are identified as sign positions and written to an output file, transmitted to another device, and/or displayed to a user. Further, the signals may be classified by type (e.g., stop sign, speed limit sign, or another type of sign).

The following embodiments relate to several technological fields including but not limited to navigation, autonomous driving, assisted driving, traffic applications, and other location-based systems. The following embodiments achieve advantages in each of these technologies because an increase in the accuracy of sign detection improves the effectiveness, efficiency, and speed of specific application in these technologies. In each of the technologies of navigation, autonomous driving, assisted driving, traffic applications, and other location-based systems, identifications of signs in collected images improves the technical performance of the application. In addition, users of navigation, autonomous driving, assisted driving, traffic applications, and other location-based systems are more willing to adopt these systems given the technological advances in object detection and classification.

FIG. 1 illustrates an example system for image segmentation. In FIG. 1, one or more vehicles 124 are connected to the server 125 though the network 127. The server 125 includes an image segmentation controller 121 (e.g., sign detection controller) that identifies one or more physical objects or features in an image. The physical objects may include road objects, street furniture, road signs, or other vehicles. The road objects may include objects associated with the road that are indicative of the path of the road, including reflectors, curbs, road boundary lines, road center lines, or other objects. The street furniture may include items associated with the street including benches, traffic barriers, streetlamps, traffic lights, traffic signs, bus stops, tram stops, taxi stands, or other items. The features may include roadways, vegetation, topographical aspects, or other items. The features may be described as a shape, height, or texture. The features may include a portion of an object or characteristic of an object. Example portions of objects may include a particular side or surface of any of these objects. Example object characteristics may include a dimension of the object, a size of the object, a color of the object, a shape of the object, or other characteristics. While embodiments described herein are discussed in term of road signs, other objects may be detected and identified in any of the embodiments.

The vehicles 124 may be directly connected to the server 125 or through an associated mobile device 122. A map developer system, including the server 125 and a geographic database 123, exchanges (e.g., receives and sends) data from the vehicles 124. The mobile devices 122 may include local databases corresponding to a local map, which may be modified according to the server 125. The local map may include a subset of the geographic database 123 and are updated or changed as the vehicles 124 travel. The mobile devices 122 may be standalone devices such as smartphones or devices integrated with vehicles. In some embodiments the local maps are modified according to data collected by the mobile device 122 or vehicle 124. In other embodiments, the collected data is transferred to the server 125 for augmenting the geographic database 123. Additional, different, or fewer components may be included.

Each vehicle 124 and/or mobile device 122 may include position circuitry such as one or more processors or circuits for generating probe data. The probe data may be generated by receiving GNSS signals and comparing the GNSS signals to a clock to determine the absolute or relative position of the vehicle 124 and/or mobile device 122. The probe data may be generated by receiving radio signals or wireless signals (e.g., cellular signals, the family of protocols known as WiFi or IEEE 802.11, the family of protocols known as Bluetooth, or another protocol) and comparing the signals to a pre-stored pattern of signals (e.g., radio map). The mobile device 122 may act as probe 101 for determining the position or the mobile device 122 and the probe 101 may be separate devices.

Each vehicle 124 and/or mobile device 122 may include an image sensor 102 such as a camera or charge coupled device (CCD) configured to detect and collect data for the surroundings of the vehicle 124 and/or mobile device 122. The camera or other sensor data may be coupled with image processing circuitry to analyze the data. Images may be collected by the image sensor 102 while traveling along the roadway or in another position. The image sensor 102 may be a visible spectrum camera, an infrared camera, an ultraviolet camera or another camera. The camera may be mounted on the vehicle 124 driven along the roadway.

The vehicle 124 may include one or more distance data detection device or sensor 103, such as a light detection and ranging (LiDAR) device. The distance data detection sensor 103 may generate point cloud data. The distance data detection sensor 103 may include a laser range finder that rotates a mirror directing a laser to the surroundings or vicinity of the collection vehicle on a roadway or another collection device on any type of pathway or stationary position. Other types of pathways may be substituted for the roadway in any embodiment described herein.

Each image or point cloud may be associated with or stored with a timestamp and/or a location stamp based on the time and location that the image was collected. In another example, the images may be collected in response to time intervals (e.g., every 0.5 second, every second) as the vehicle travels along the roadway such that the series of images are at a predetermined time interval. In this example, the geographic distance between images varies as the speed of the camera or collection vehicle changes. The timestamp may be omitted when the images are collected at the predetermined time interval. In another example, the images may be collected in response to location intervals (e.g., every meter, every 10 feet) as the vehicle travels along the roadway such that the series of images are at a predetermined location interval. In this example, the time between images varies as the speed of the camera or the collection vehicle changes. The location stamp may be omitted when the images are collected at the predetermined location interval.

The probe data forming the location stamp may include a geographic location such as a longitude value and a latitude value. In addition, the probe data may include a height or altitude. The probe data may be collected over time and include timestamps. In some examples, the probe data is collected at a predetermined time interval (e.g., every second, ever 100 milliseconds, or another interval). In some examples, the probe data is collected in response to movement by the probe 101 (i.e., the probe reports location information when the probe 101 moves a threshold distance). The predetermined time interval for generating the probe data may be specified by an application or by the user. The interval for providing the probe data from the mobile device 122 to the server 125 may be may the same or different than the interval for collecting the probe data. The interval may be specified by an application or by the user.

Communication between the vehicles 124 and/or between the mobile device 122 and the server 125 through the network 127 may use a variety of types of wireless networks. Example wireless networks include cellular networks, the family of protocols known as WiFi or IEEE 802.11, the family of protocols known as Bluetooth, or another protocol. The cellular technologies may be analog advanced mobile phone system (AMPS), the global system for mobile communication (GSM), third generation partnership project (3GPP), code division multiple access (CDMA), personal handy-phone system (PHS), and 4G or long term evolution (LTE) standards, 5G, DSRC (dedicated short range communication), or another protocol.

Figure 2:
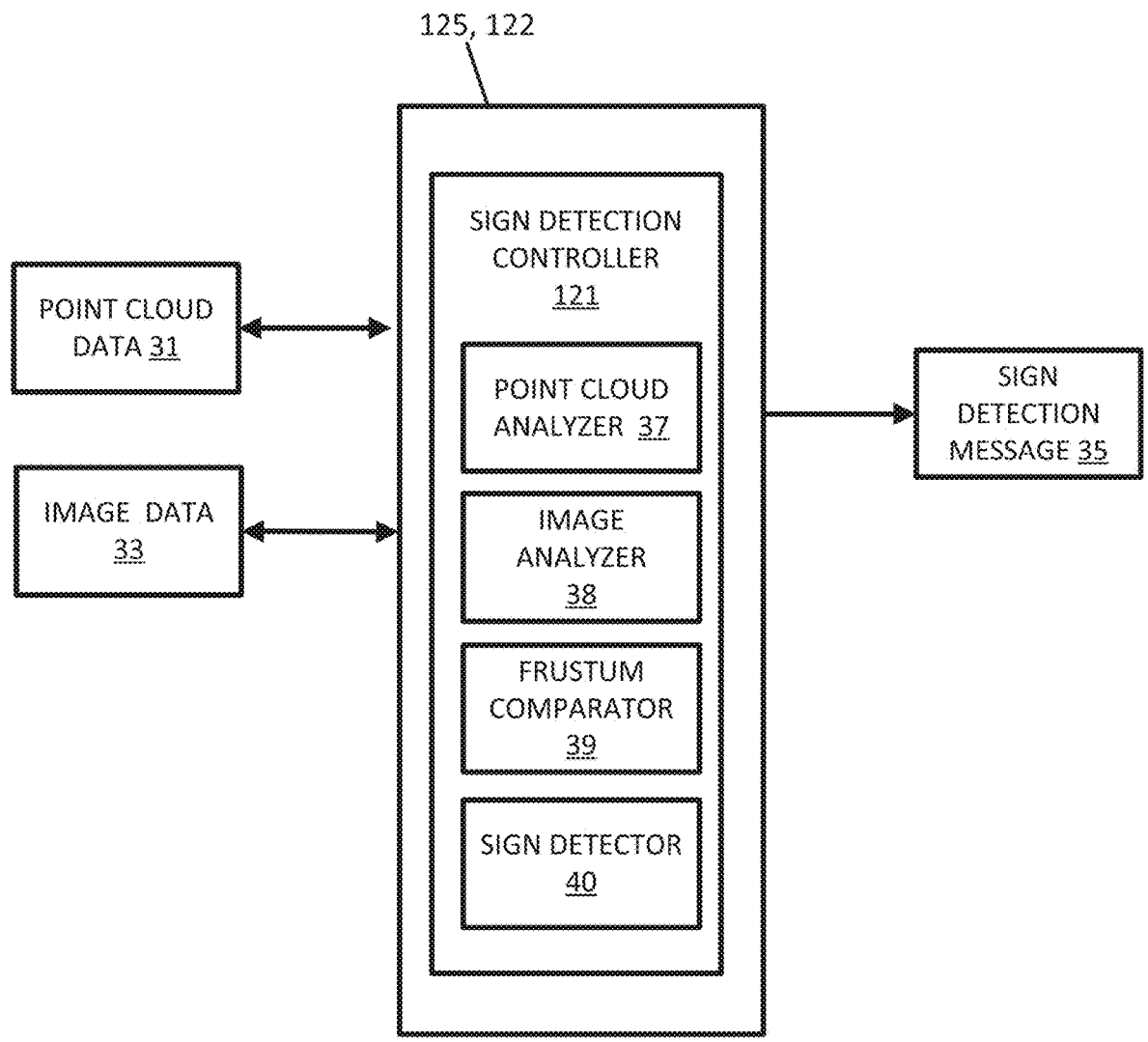
FIG. 2 illustrates an example sign detection controller.

FIG. 2 illustrates an example sign detection controller 121, which may be implemented by the server 125, the mobile device 122, or a combination thereof. The sign detection controller 121 may include a point cloud analyzer 37 (point cloud analysis module), an image analyzer 38 (image analysis module), a frustum comparator 39 (frustum comparison module), and a sign detector 40 (sign detection module). Additional, different, or fewer components may be included.

The point cloud analyzer 37 is configured to receive point cloud data 31 associated with a geographic region and classify at least one point neighborhood in the point cloud. The point cloud data 31 may be defined according to three dimensional coordinates. The neighborhood may be defined by a spatial volume or area.

The point cloud analyzer 37 defines a neighborhood of data points of the point cloud data 31 by iteratively searching the immediate neighborhood of each data point for the shape with the highest certainty that describes that neighborhood. The neighborhood may be defined by a spatial volume or area. In some examples, the spatial volume is spherical and set by a predetermined radius. Thus, the neighborhood includes the points within the predetermined radius to a starting point. In other examples, the radius is variable and may be iteratively increased until a classification can be made. The radius may be determined using the concept of entropy (e.g., Shannon entropy) for calculating the most descriptive shape in the locality of each point to select the neighborhood radius that corresponds to the lowest entropy. For example, a spherical neighborhood size is based on a 3D point and optimal neighborhood size k (closest 3D points to the 3D point or 3D points within an optimum radius). Three eigenvectors $\lambda_1$, $\lambda_2$, $\lambda_3$ are derived to describe the local 3D structure around the 3D point. In this example, the eigenvalues of 3D points within a radius of R around any 3D point are arranged in decreasing order such that $\lambda_1$ is the largest and $\lambda_3$ is the smallest. The linearity of the neighborhood may be defined according to Equation 1:

$$\alpha_1 = \frac{\sqrt{\lambda_1} - \sqrt{\lambda_3}}{\sqrt{\lambda_1}} \qquad \text{Eq. 1}$$

The planarity of the neighborhood may be defined according to Equation 2:

$$\alpha_2 = \frac{\sqrt{\lambda_2} - \sqrt{\lambda_3}}{\sqrt{\lambda_1}} \qquad \text{Eq. 2}$$

The volumetricity of the neighborhood may be defined according to Equation 3:

$$\alpha_2 = \frac{\sqrt{\lambda_3}}{\sqrt{\lambda_1}} \qquad \text{Eq. 3}$$

where $\alpha_1+\alpha_2+\alpha_3=1.0$. These geometric descriptors may be treated as a probability of the neighborhood being linear, planar, or volumetric. The dimensionality of the neighborhood may be defined as the $\alpha_d$ that has the maximum probability. An entropy function (e.g., the Shannon entropy function) may be applied to these probabilities to quantify the uncertainty of the shape of the neighborhood. The lower the entropy, the more certain the dimensionality of the points. The entropy $E_r$ may be calculated according to Equation 4:

$$E_r = -\sum_{d=1}^{3}(\alpha_d \ln(\alpha_d)) \qquad \text{Eq. 4}$$

Accordingly, the optimal neighborhood size k is selected by minimizing the entropy $E_r$ over varying values for k (i.e., the highest certainty of the neighborhood shape). For example, an iterative algorithm may be used to select the optimum radius for each point that has the lowest entropy:

For each point
  Starting with a user selected minimum radius
  Loop over a range of radius values
    Calculate geometric descriptors
    Calculate entropy
  end.
  Select the radius with the lowest entropy as the optimum radius end.

Once an optimum radius is defined for each point, local geometric descriptors, such as eigenvalues and dimensionality, may be calculated using the optimum radii. These features can be used to segment the point cloud or for classifying objects. Additionally or alternatively, the radius may also be limited to a range that correlates with the actual object sizes to be detected and the point densities seen in actual data.

Possible classifications of the neighborhood may include linear, planar, volumetric. The point cloud analyzer 37 may select a neighborhood and a Bayesian classification algorithm. The classification algorithm may classify the neighborhood of points by determining the individual probabilities that the neighborhood is linear, planar, and volumetric given the positions of the points in the neighborhood.

As the scanning vehicle 124 progresses along the drive, the points of the point cloud (e.g., LIDAR points) are classified as linear, planar, or volumetric, based on neighboring points in 3D space. Nearby planar points are grouped together into clusters. These clusters are locally planar regions which are potential sign locations, which may be referred to as position candidates. The position candidates are updated in response to new point cloud data is received as the drive progresses.

The point cloud analyzer 37 may determine when one or more position candidates is mature. The position candidate is mature when no more points are being added. The point cloud analyzer 37 identifies mature candidate positions as complete potential positions for signs.

Figure 3:
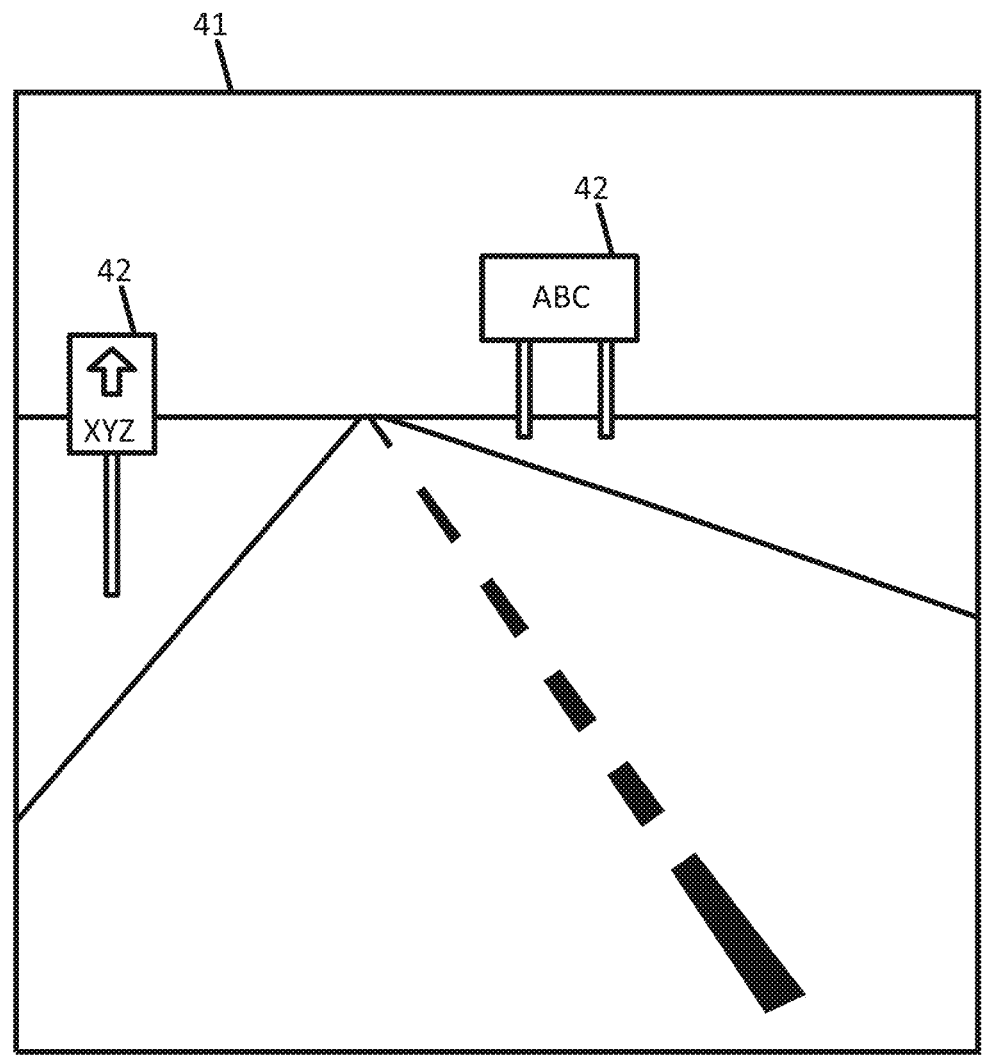
FIG. 3 illustrates an example two-dimensional image collected by the example system for sign detection.

FIG. 3 illustrates an example 2D image 41 collected by the image sensor 102. The image 41 may include one or more road signs 42. The image 41 may be made up of image data 33 including pixel values or arrays made of multiple pixel values. The pixel values may include color values, brightness values, luminance values, or hue values that represent the pixels in the image 41. The image analyzer 38 is configured module configured to receive image data associated with the geographic region determine whether the image includes any potential signs.

The image analyzer 38 may utilize a variety of image processing techniques for identifying signs in the image 41. Example image processing techniques include an edge detection, feature extraction or transforms (e.g., scale invariant feature transform), vector classification, or neural network. In edge detection, the brightness, or another image characteristic, of adjacent image pixels in the probe data. In feature extraction or transforms, the image is analyzed to identify particular features that indicate the layout. Similarly, vector classification may compare vectors representative of boundary elements to vectors from the image.

A neural network may include a training phase and a classification stage. In the training stage, an image with known locations of signs may be broken up into images patches and stored according to an indicator of whether the image patch comprises a sign or a portion of a sign. In one example, the image location includes a first coordinate value and a second coordinate value (e.g., [x, y] or [horizontal value, vertical value]) for a point of the object of interest. The point may be a corner (e.g., top left corner) or a center of the object of interest. The neural network is trained according to the indicator and the image patches. The indicator and the image patches may be referred to as ground truth for sign locations. When using the neural network, after training, sign detection controller 121 receives the image 41 and analyzes the image 41 to identify sign locations. The neural network may use a sliding window technique in which the neural network determines whether each pixel is part of a sign by providing a wind with the pixel in the center to the neural network.

Using any of these image processing techniques, the sign detection controller 121 determines subregion in the image 41 that may include a sign. These subregions may be referred to as sightings or 2D sign detections. The subregions may have a variety of shapes. The shapes may be selected from a template list of predetermined road shapes including square, rectangular, circular, triangular, hexagonal, or another shape.

This algorithm takes these sightings and matches them with the location stamp for the location and the time stamp for the time of the image sensor 102 and the distance sensor 103. From this information, the algorithm calculates the inverse camera projection to find the region in 3D space which maps to the sighting. This 3D space is a pyramidal region (the "sighting frustum") whose point is at the camera center, and which extends away in the direction the camera is pointing.

Figure 4A:
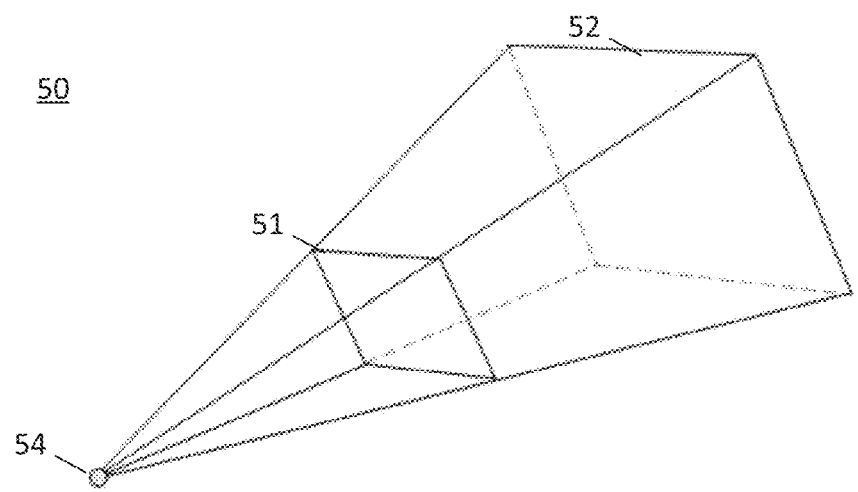
FIGS. 4A and 4B illustrates an example frustum.
Figure 4B:
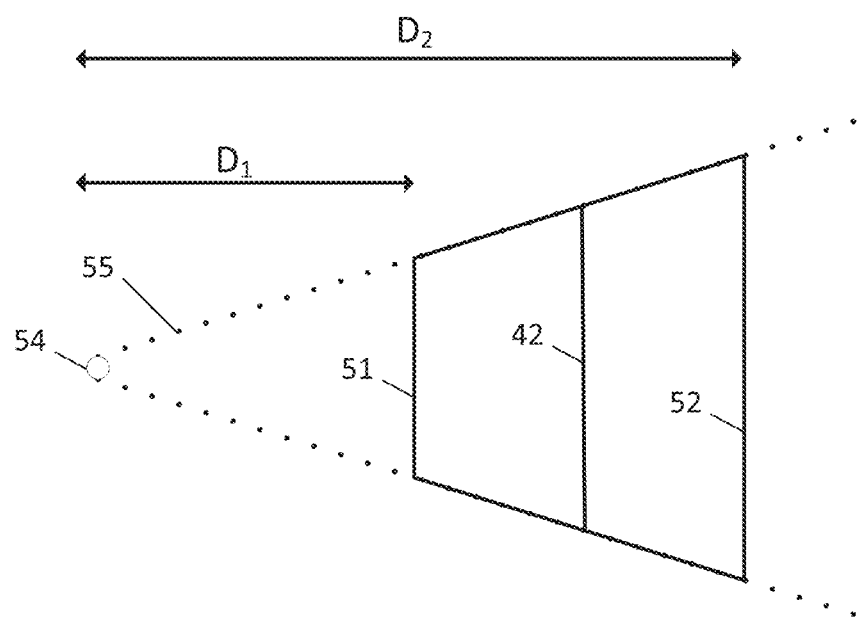

For example, FIGS. 4A and 4B illustrates an example frustum 50 as a three-dimensional region in view of the image sensor 102 (e.g., camera) of the mobile device 122. The frustum 50 is the view that the image sensor 102 (e.g., camera) can image at any given position. A point 54 is the center of the image sensor 102 or a lens location of the image sensor 102 that defines the frustum 50. The frustum 50 may have the shape as a pyramid or a clipped pyramid. The pyramid may be limited according to the focal length range of the image sensor 102, which forms the clipped pyramid. The sighting frustum 50 is calculated based on a location of an image sensor 102 that collected the image data associated with the geographic region.

Figure 5:
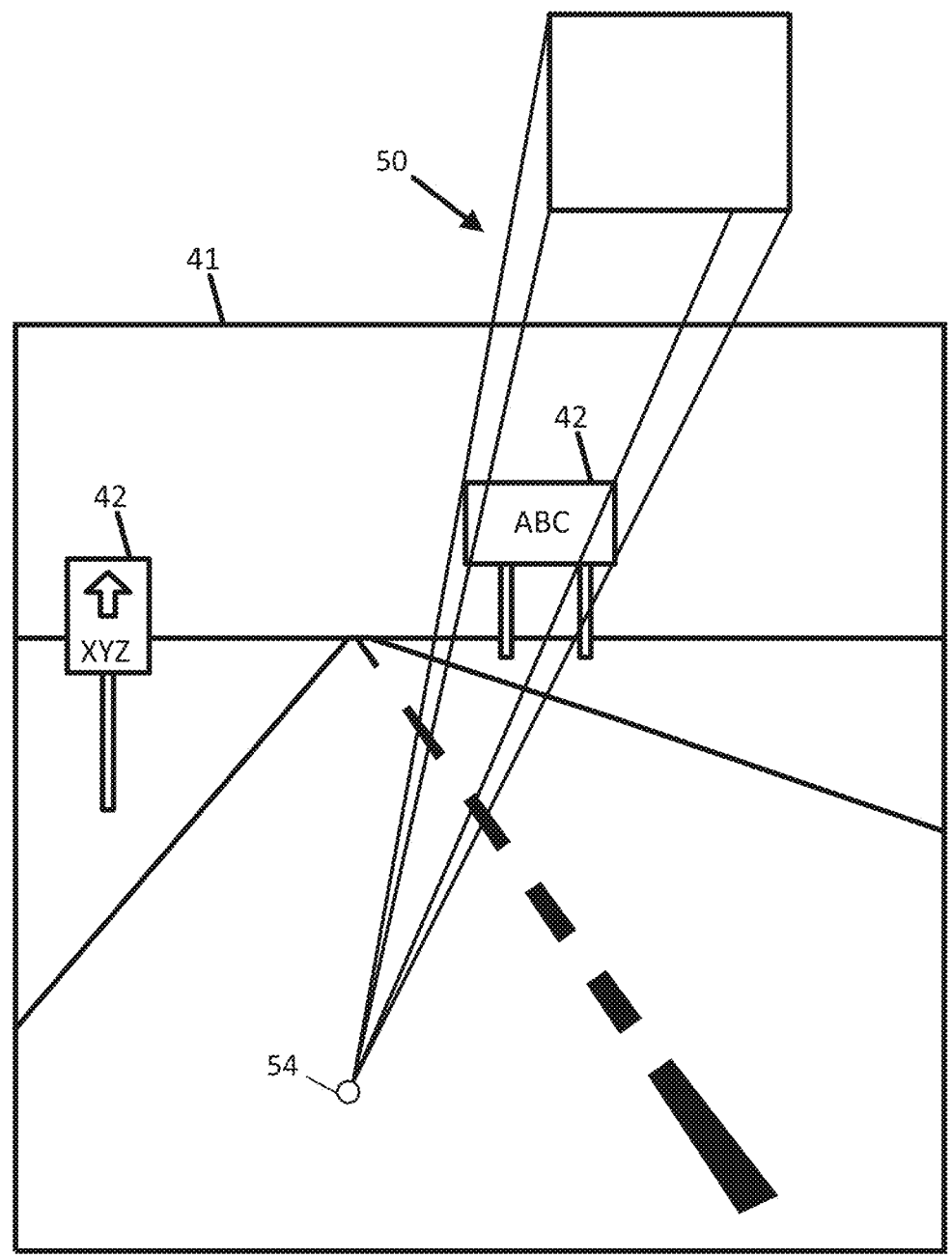
FIG. 5 illustrates an example frustum determined from the two-dimensional image of FIG. 3.

As shown in FIG. 4B, the frustum 50 may be a solid defined by the detected image of the road sign 42 in the 2D image. The image of the road sign 42 lies between two substantially parallel planes intersecting the solid such as near plane 51 and far plane 52. The near plane 51 may be defined by a first focal distance D1 of the image sensor 102, and a second focal distance D2 of the image sensor 102. FIG. 5 illustrates the frustum 50 on the image 41.

FIGS. 4A-B and 5 illustrate an example where frustum 50 is a pyramidal frustum. The frustum 50 may also be a conical frustum with circular bases or another solid with polygon bases. The frustum 50 may be irregularly shaped. The frustum 50 spans a geographic area. The geographic area is bounded by two planes representing the closest distance and farthest distance that the camera can properly image. The frustum 50 may be represented in various ways. For example, a three-dimensional frustum 50 may be precisely described by eight points in a three-dimensional space. In another example, a three-dimensional frustum may be estimated by four points defining the near plane 51 and a viewing distance to the far plane 52. This example may estimate the far plane 52 as having the same area as the near plane 51. In another example, a three-dimensional frustum may be estimated by four points defining the far plane 52 and a viewing distance to the near plane 51. This example may estimate the near plane 51 as having the same area as the far plane 52. Alternatively, the frustum may be estimated as a plane extending indefinitely direction, which may be defined by three points in the plane. In addition, the plane may be assumed to be vertical, in which case only two points are needed to define the plane of the frustum 50.

Figure 6:
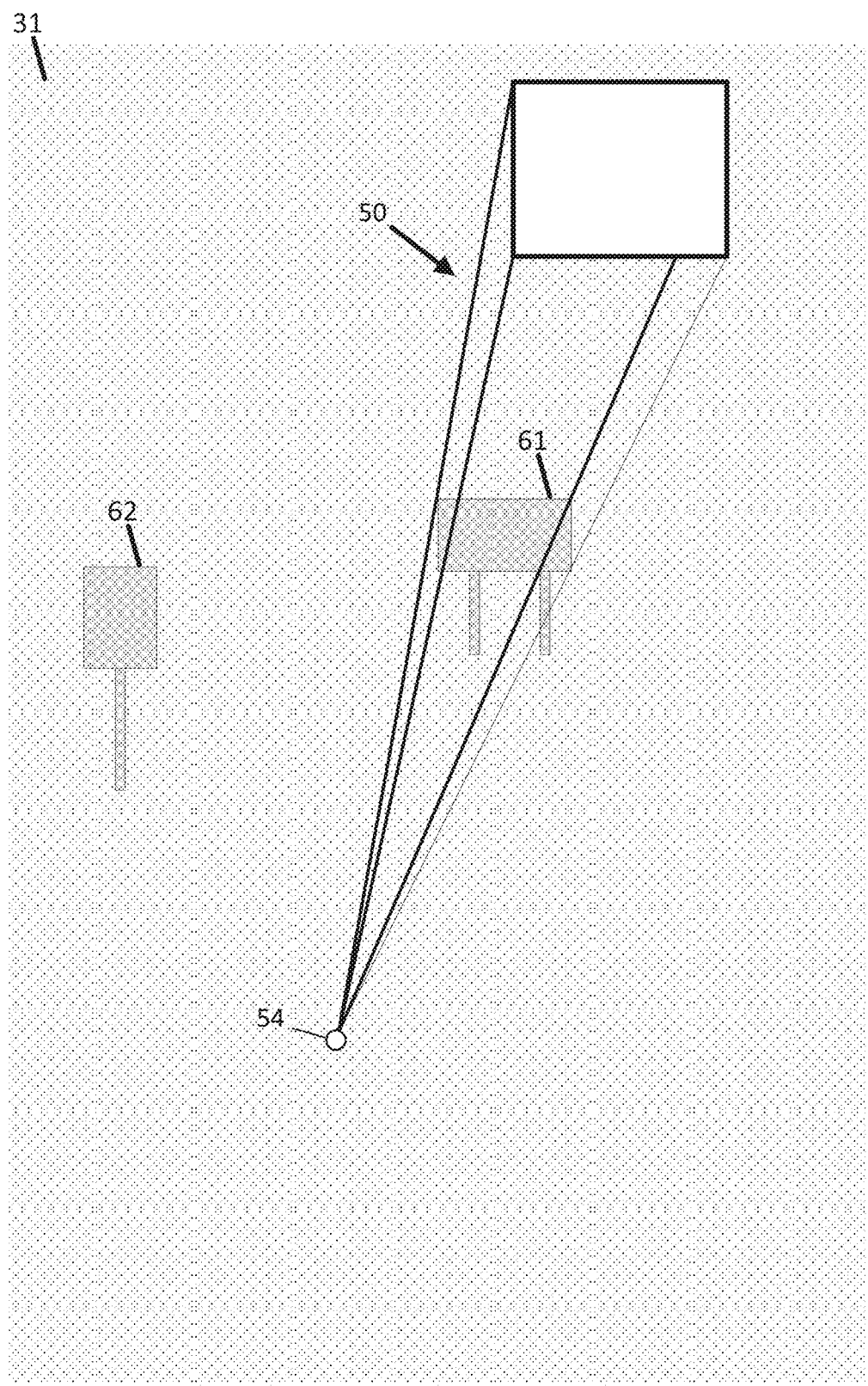
FIG. 6 illustrates an example point cloud overlaid with the frustum.

FIG. 6 illustrates an example point cloud from the point cloud data 31 overlaid with the frustum 50 in 3D space. The point cloud data includes one or more neighborhoods previously classified as planar and designated as sign position candidates. The one or more neighborhoods may represent planar objects such as signs 61 and 62. The frustum comparator or the frustum comparison module 39 is configured to perform a comparison of the sighting frustum 50 to the sign position candidate having at least one point neighborhood classified as planar.

The sign detector 40 is configured to provide a location for the sign detection in response to the comparison of the sighting frustum to the sign position candidate. The location includes the coordinates from the point cloud data 31 where the sign position candidates match the sighting frustum 50. If a sighting is correct (i.e. there really is a sign at the position and the 2D detector or the image analyzer 38 has correctly identified its location in the image), then the surface it is painted on must lie in the sighting frustum 50, and should have been identified as a position candidate.

The coordinates where the sign position candidates match the sighting frustum 50 may be provided to a localization system, a driving system, or a mapping system, which are discussed in more detail in subsequent sections.

Figure 7:
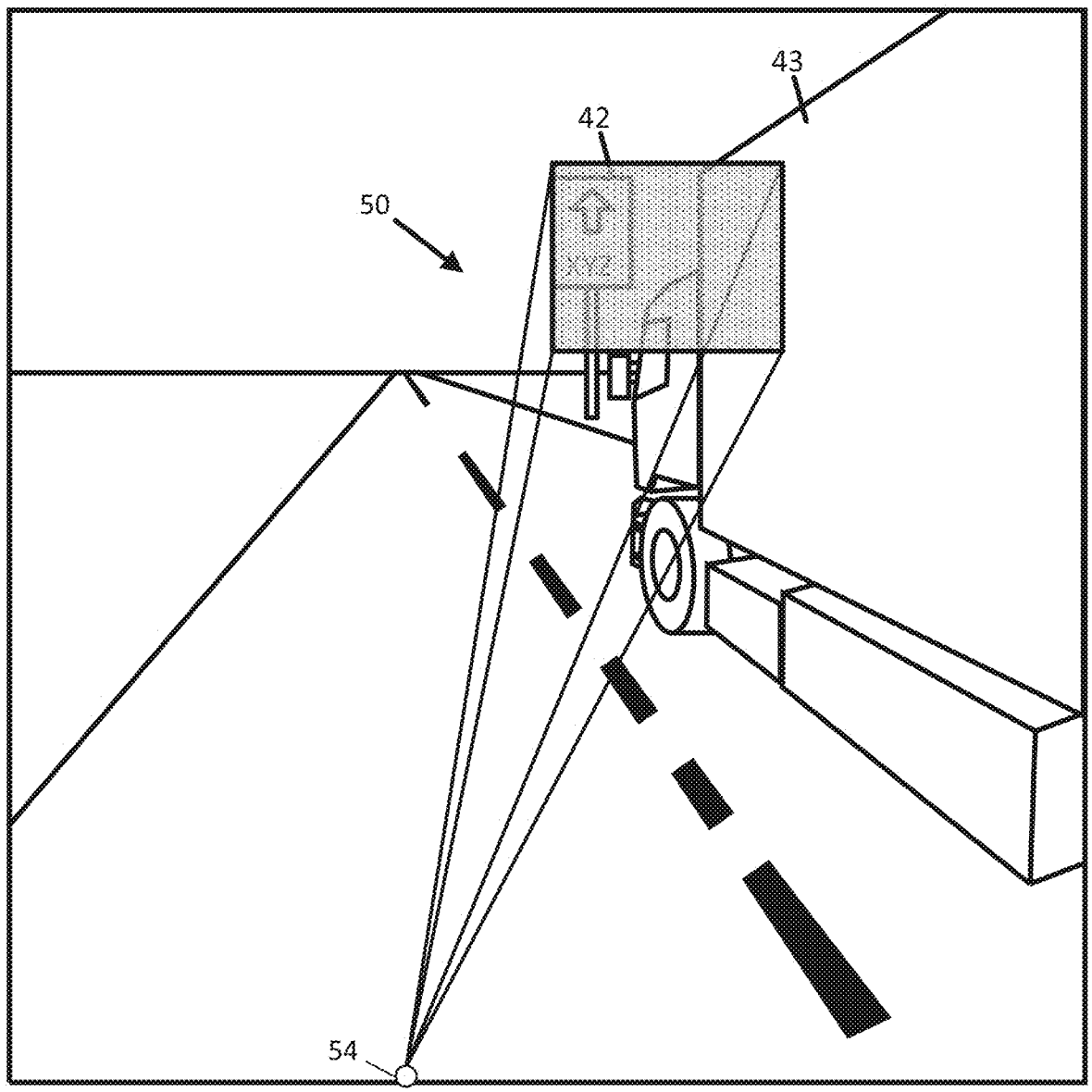
FIG. 7 illustrates an example point cloud with multiple planar regions overlapped with the frustum.
Figure 8:
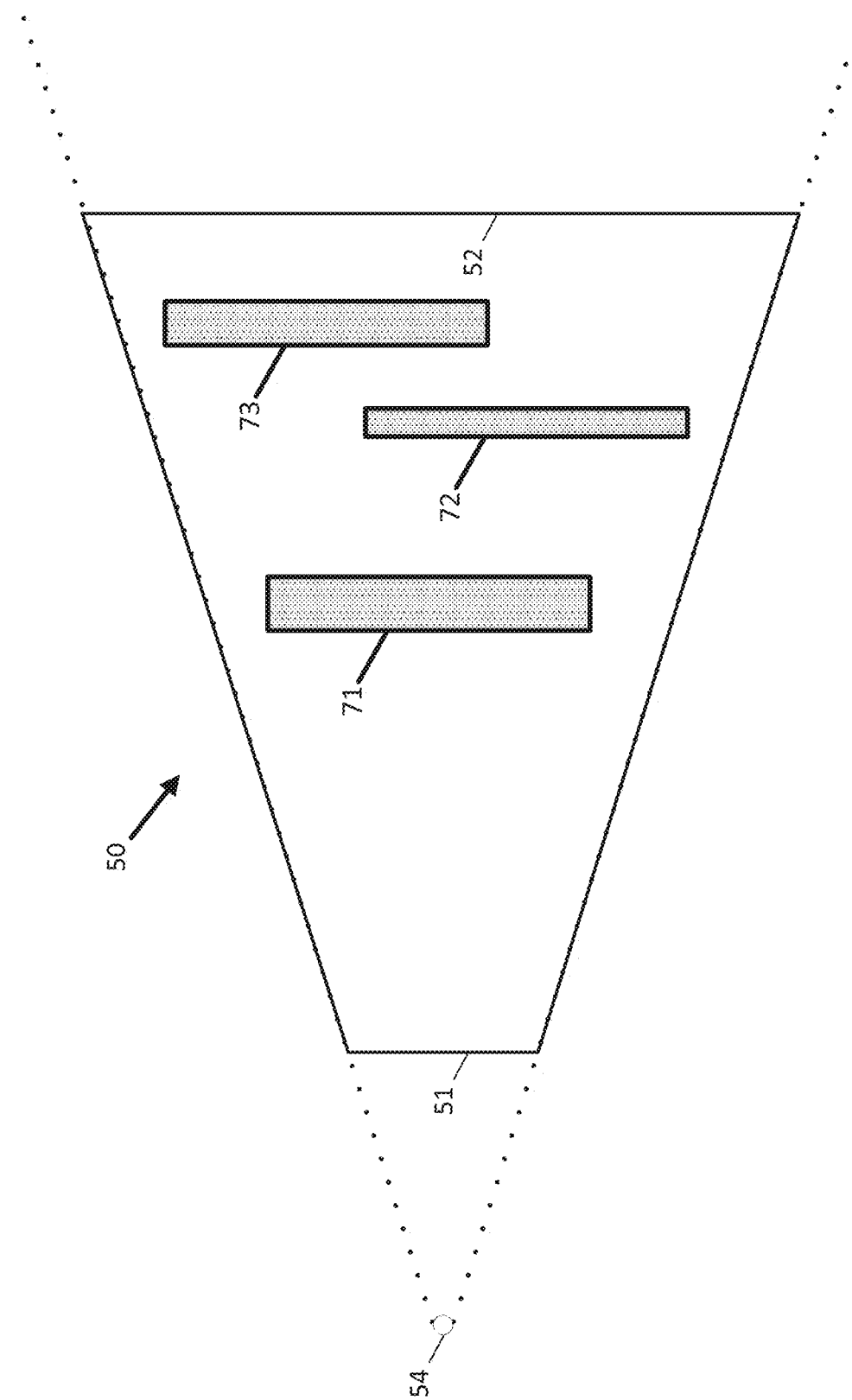
FIG. 8 illustrates an example of multiple planar overlapped with the frustum.

FIGS. 7 and 8 illustrate examples of multiple intersections between the sighting frustum 50 and the sign position candidates. All of the non-empty intersections between sighting frustums and position candidates are possible locations for a sign. The algorithm calculates all of these intersections, which may be referred to as positioned-sightings. Positioned-sightings are polygonal subregions of position candidate planes. Each one could be a true sign location. One sighting may intersect with many position candidates—for example, if there is a wall behind the sign, the sighting frustum 50 may intersect with the sign plane and the wall plane. For example, FIG. 7 illustrates a frustum 50 that intersects with both a sign 42 and a side of truck 43, which are both neighborhoods in the point cloud data 31 that are classified as planar.

FIG. 8 illustrates a top down view of a frustum 50 that intersects planar neighborhoods 71, 72, and 73 that represent multiple objects. The multiple objects may include signs that are arranged vertically. For example, planar neighborhood 71 may be associated with a sign at a first vertical position, planar neighborhood 72 may be associated with a sign at a second vertical position, and planar neighborhood 73 may be associated with a sign at a third vertical position. Thus, from the viewing point along the roadway from the point 54, all of the signs may be visible. Likewise, a sign may be attached to an object that is also classified as planar. For example, the planar neighborhood 71 may represent a sign that is attached to a bridge or a building that is represented by planar neighborhood 72.

In addition, one sign may be associated with several sightings. Camera images are captured frequently, so data representing the same sign may be collected multiple times as the scanning vehicle 124 drives along a path. The sign detection controller 121 is configured to group together multiple instances of the same sign. For example, the sign detection controller 121 may determine whether multiple sighting frustums intersect with the same position candidate. When the position candidate detector has found the same sign in multiple instances, the sign detection controller 121 generates multiple frustums for the same sign, and the sighting frustums should all intersect with the same position candidate. The positioned-sightings should all overlap on the position candidate. The sign detection controller 121 groups multiple positioned-sightings which overlap on the same position candidate into association sets. The association sets are groups of sightings associated with a particular 3D planar location, i.e. putative identifications of positioned signs.

The sign detection controller 121 is also configured to analyze the multiple association sets for a sign that is detected in multiple images. One sighting may appear in many positioned sightings and so, therefore, in many association sets. But one sighting may only, logically, be of one sign. The sign detection controller 121 may choose, for each sighting, exactly one association set that the sign occurs in. The sign detection controller 121 compares the multiple association sets and selects the most accurate associate set. The sign detection controller 121 may rank all the association sets by focus and then picking the sets with the highest focal overlap.

Figure 9:
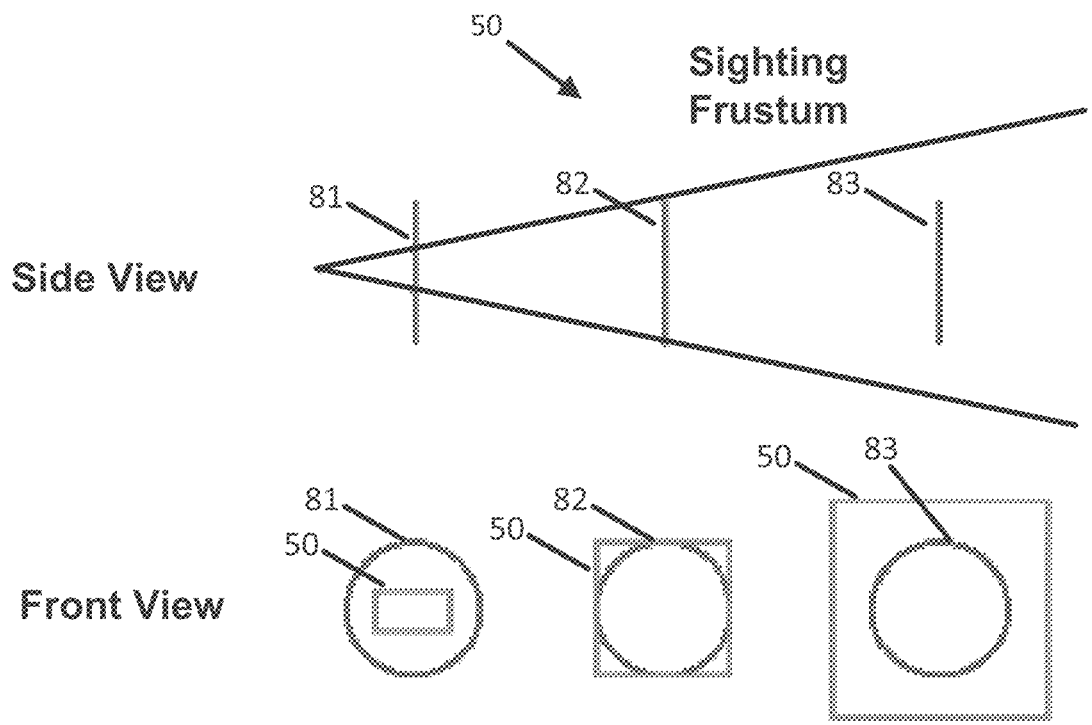
FIG. 9 illustrates example coverage ratings for the point cloud overlaid with the frustum.
Figure 9:

FIG. 9 illustrates some examples of metrics for selection of the most accurate association set. The metrics may include coverage, parsimony, and focal overlap. Other metrics may be used.

The sign detection controller 121 is configured to select one or more association sets whose positioned sightings cover as much of the position candidate as possible, and which also do it parsimoniously, in the sense that they are not much bigger than required. The sign detection controller 121 is configured to identify the association sets as multiple locations for sign detection in response to the comparison of the sighting frustum to the sign position candidate having at least one point neighborhood classified as planar. The sign detection controller 121 may calculate an intersection of the at least one point neighborhood and the sighting frustum. The intersection is an area of overlap for the point neighborhood and the sighting frustum.

In one example, the intersection of the at least one point neighborhood (position candidate) and the sighting frustum may be an input to calculate a coverage value for the intersection of the at least one point neighborhood and the sighting frustum. The coverage value (CV) is calculated based on an area of the intersection $A(S \cap C)$ of the at least one point neighborhood and the sighting frustum and the area of the at least one point neighborhood $A(C)$ according to Equation 5.

$$CV = \frac{A(S \cap C)}{A(C)} \qquad \text{Eq. 5}$$

The coverage value may be a value ratio, or a percentage, that indicates the portion of the intersection of the at least one point neighborhood (position candidate) and the sighting frustum as compared to the at least one point neighborhood taken alone. Alternatively, the coverage value may be an absolute value measured in pixels or square units of area (e.g., feet$^2$ or meters$^2$). The coverage value may be a fraction between 0 and 1.

The sign detection controller 121 may be configured to calculate a parsimony value from the intersection of the at least one point neighborhood and the sighting frustum. The parsimony value (PV) is calculated based on an area of the intersection $A(S \cap C)$ of the at least one point neighborhood and the sighting frustum and the area of the sighting frustum $A(S)$ according to Equation 6.

$$PV = \frac{A(S \cap C)}{A(S)} \qquad \text{Eq. 6}$$

The parsimony value may be a value between 0 or 1, or a percentage, that indicates the fraction portion of the intersection of the at least one point neighborhood (position candidate) and the sighting frustum as compared to the sighting frustum taken alone. Alternatively, the coverage value may be an absolute value measured in pixels or square units of area (e.g., feet$^2$ or meters$^2$).

The sign detection controller 121 may be configured to calculate a focal overlap value as a minimum value between the coverage value and the parsimony value. The focal overlap value may be the output of a minimum value function that takes the coverage value and the parsimony value as inputs. In other words, the sign detection controller 121 selects the smaller value between the coverage value and the parsimony value. When the coverage value and the parsimony values are fractional values, or decimal values between 0 and 1, the focal overlap value is also a fractional value or a decimal value between 0 and 1. The focal overlap value may be referred to as a focus value for the intersection of the at least one point neighborhood (position candidate) and the sighting frustum.

The sign detection controller 121 may be configured to select one or more association sets according to the focal overlap value. The sign detection controller 121 may identify multiple association sets when there are multiple planar regions in the point cloud data 31 that match the frustum 50 from the image data 33 and calculate a focal overlap value for the multiple association sets. The sign detection controller 121 is configured to rank the multiple focal overlap values according an ascending order. The sign detection controller 121 may sort the focal overlap values and store them in order in memory. The sign detection controller 121 may then select the highest focal overlap value from the ranked multiple focal overlap values. The sign detection controller 121 may also treat association sets that are not selected differently. For example, the sign detection controller 121 may flag or remove association sets that are not selected as the highest focal overlap value.

The sign detection controller 121 may evaluate the association sets for object lifetime or information sufficiency. Example measures of object lifetime may include maturity and staleness. For the image data 33, signs may be included in images at a first distance (e.g., more than 100 m) away from the camera in front of the scanning vehicle 124, particularly for large highway signs. For the point cloud data 31, data (e.g., LIDAR) is gathered at a second distance (e.g., a range of less than 50 m), and point capture may continue after the vehicle has passed a sign. Accordingly, the sign detection controller 121 may not match sightings with position candidates until a substantial delay after the images are collected, and the sign detection controller 121 cannot calculate sighting frustum and position-candidate intersections until it can be assumed have scanned all the points on the sign plate have been scanned. The sign detection controller 121 calculates the maturity value and/or the staleness value in order to manage these issues.

The sign detection controller 121 is configured to calculate the maturity value based on a distance traveled by the image sensor 102, for example, by movement of the mobile device 122 or the vehicle 124. The distance traveled may be calculated by subtraction of location stamps. The sign detection controller 121 may determine that a sighting and a position candidate is mature (e.g., has a maturity value of 1) when the distance traveled indicates that the data that defines the object's geometry has been connected. For sightings, the sign detection controller 121 may determine that this happens immediately as the image sensor 102 captures the image. For position candidates, the sign detection controller 121 may determine that this happens when the distance passed by the distance sensor 103 reaches a threshold that indicates point cloud data 31 (e.g., LIDAR points) are no longer being added to the position candidate. In one example, the threshold is 20 m past the point where points in the point cloud data 31 were added to the position-candidate. The sign detection controller 121 may determine whether the position candidates and sightings are mature before determining the associated sets described herein.

The sign detection controller 121 is configured to calculate the staleness value based on a distance traveled by the image sensor 102, for example, by movement of the mobile device 122 or the vehicle 124. Consider a sighting of a sign far in front of the scanning vehicle. This sighting frustum 50 will, eventually, intersect with the sign's position candidate when the image sensor 102 is closer. Previously, though, the sighting frustum 50 may also intersect with occlusions (e.g. the back of a truck). Thus, is the sign detection controller 121 identifies signs from association sets as soon as possible, that is as soon as the sightings and position candidates are mature, the sign detection controller 121 may miss better associations that could be made if additional delay was added for the mobile device 122 or the vehicle 124 to travel closer to the sign.

The sign detection controller 121 may determine whether a time delay has passed, which is defined as a staleness value. The sign detection controller 121 may determine whether the mobile device 122 or vehicle 124 has traveled a threshold distance. In one example, sightings are stale at a first distance value (e.g., 250 m) past the point where the image data 33 was captured, and that position candidates are stale at a second distance value (e.g., 50 m) past the point where point cloud data 31 was last collected. If all the sightings and the position candidate in an association-set are stale, the sign detection controller 121 determines that the association set is stale. Once an association set is stale, there is nothing in the future can change the determinations of the sign detection controller 121 for the ranking of the association set as a potential sign location.

Figure 10:
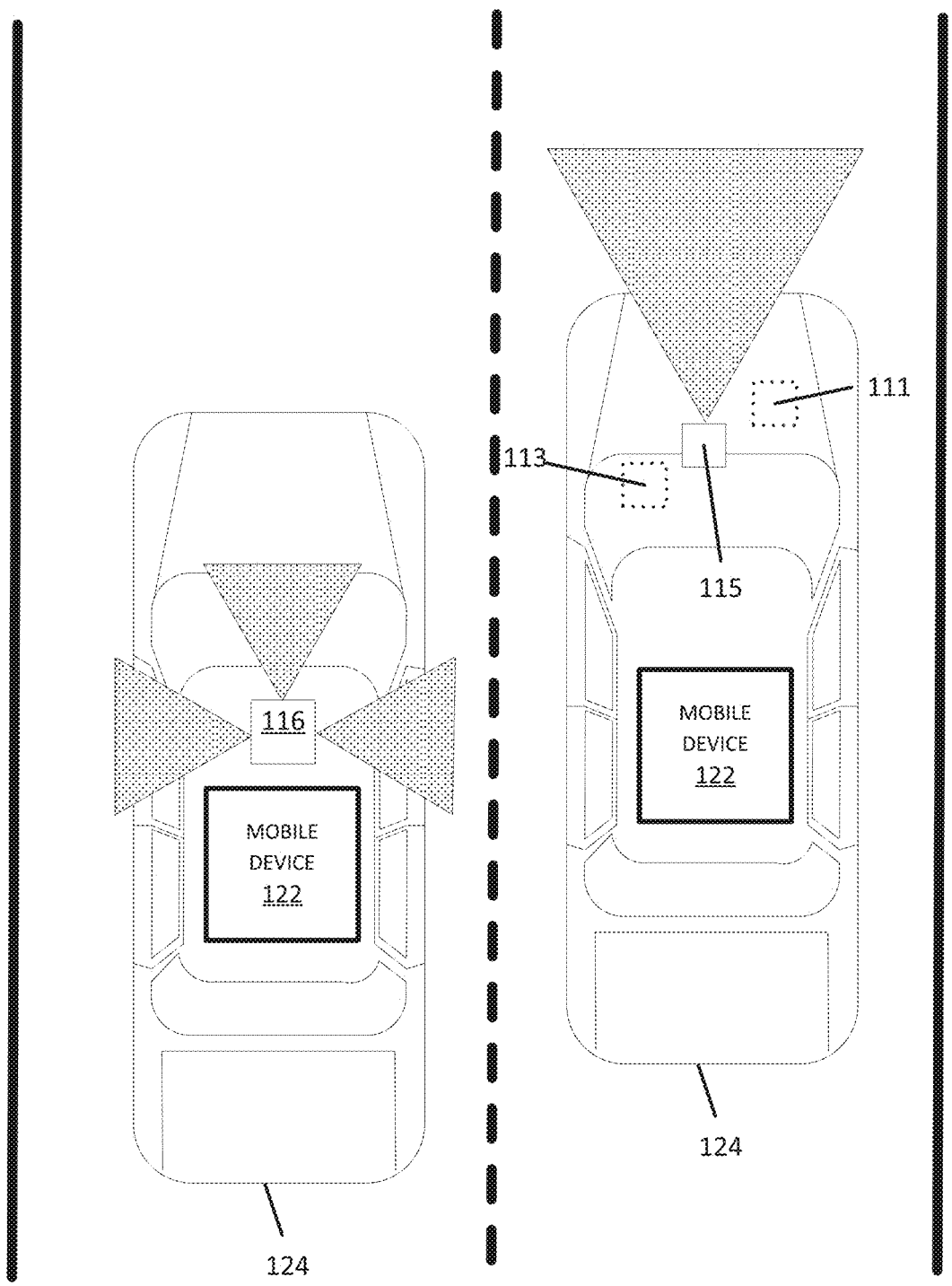
FIG. 10 illustrates exemplary vehicles of the system of FIG. 1.

FIG. 10 illustrates an example vehicles 124 that include a sensor array for data collection. One of the vehicles 124 may be a collection vehicle configured to collect data in the area proximate to the vehicle 124. The collection vehicle may include one or more distance data collection device or sensor, such as a light detection and ranging (LiDAR) device. The distance data collection sensor may generate point cloud data. The distance data collection sensor may include a laser range finder that rotates a mirror directing a laser to the surroundings or vicinity of the collection vehicle on a roadway or another collection device on any type of pathway. Other types of pathways may be substituted for the roadway in any embodiment described herein.

A connected vehicle includes a communication device and an environment sensor array for reporting the surroundings of the vehicle 124 to the server 125. The connected vehicle may include an integrated communication device coupled with an in-dash navigation system. The connected vehicle may include an ad-hoc communication device such as a mobile device 122 or smartphone in communication with a vehicle system. The communication device connects the vehicle to a network including at least one other vehicle and at least one server. The network may be the Internet or connected to the internet.

The sensor array may include one or more sensors configured to detect surroundings of the vehicle 124. The sensor array may include multiple sensors. Example sensors include an optical distance system such as LiDAR 116, an image capture system 115 such as a camera, a sound distance system such as sound navigation and ranging (SONAR), a radio distancing system such as radio detection and ranging (RADAR) or another sensor. The camera may be a visible spectrum camera, an infrared camera, an ultraviolet camera or another camera.

The vehicles 124 may include a global positioning system, a dead reckoning-type system, cellular location system, or combinations of these or other systems, which may be referred to as position circuitry or a position detector. The positioning circuitry may include suitable sensing devices that measure the traveling distance, speed, direction, and so on, of the vehicle 124. The positioning system may also include a receiver and correlation chip to obtain a GPS signal. Alternatively or additionally, the one or more detectors or sensors may include an accelerometer built or embedded into or within the interior of the vehicle 124.

In some alternatives, additional sensors may be included in the vehicle 124. An engine sensor 111 may include a throttle sensor that measures a position of a throttle of the engine or a position of an accelerator pedal, a brake senor that measures a position of a braking mechanism or a brake pedal, or a speed sensor that measures a speed of the engine or a speed of the vehicle wheels. Another additional example, vehicle sensor 113, may include a steering wheel angle sensor, a speedometer sensor, or a tachometer sensor.

A mobile device 122 may be integrated in the vehicle 124, which may include assisted driving vehicles such as autonomous vehicles, highly assisted driving (HAD), and advanced driving assistance systems (ADAS). Any of these assisted driving systems may be incorporated into mobile device 122. Alternatively, an assisted driving device may be included in the vehicle 124. The assisted driving device may include memory, a processor, and systems to communicate with the mobile device 122. The assisted driving vehicles may respond to geographic data received from geographic database 123 and the server 125 and sign detection identification and classification data received from the sign detection controller 121 or generated locally at the vehicle.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order, and may respond to geographic data received from geographic database 123 and the server 125 and sign detection identification and classification data received from the sign detection controller 121.

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the on the position of the vehicle, and may respond to geographic data received from geographic database 123 and the server 125 and sign detection identification and classification data received from the sign detection controller 121.

Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle or based on to geographic data received from geographic database 123 and the server 125 and sign detection identification and classification data received from the sign detection controller 121.

In addition, the autonomy levels may be defined according to the following six levels. Level 0: Automated system issues warnings and may momentarily intervene but has no sustained vehicle control. Level 1 ("hands on"): The driver and the automated system share control of the vehicle. Examples are Adaptive Cruise Control (ACC), where the driver controls steering and the automated system controls speed; and Parking Assistance, where steering is automated while speed is manual. The driver must be ready to retake full control at any time. Lane Keeping Assistance (LKA) Type II is a further example of level 1 self-driving. Level 2 ("hands off"): The automated system takes full control of the vehicle (accelerating, braking, and steering). The driver must monitor the driving and be prepared to intervene immediately at any time if the automated system fails to respond properly. The shorthand "hands off" is not meant to be taken literally. In fact, contact between hand and wheel is often mandatory during SAE 2 driving, to confirm that the driver is ready to intervene. Level 3 ("eyes off"): The driver can safely turn their attention away from the driving tasks, e.g. the driver can text or watch a movie. The vehicle will handle situations that call for an immediate response, like emergency braking. The driver must still be prepared to intervene within some limited time, specified by the manufacturer, when called upon by the vehicle to do so. A traffic jam pilot, when activated by the human driver, allows the car takes full control of all aspects of driving in slow-moving traffic at up to 60 kilometers per hour. The function works only on highways with a physical barrier separating one stream of traffic from oncoming traffic. Level 4 ("attention off"): As level 3, but no driver attention is ever required for safety, i.e. the driver may safely go to sleep or leave the driver's seat. Self-driving is supported only in limited spatial areas (geofenced) or under special circumstances, like traffic jams. Outside of these areas or circumstances, the vehicle must be able to safely abort the trip, i.e. park the car, if the driver does not retake control. Level 5 ("steering wheel optional"): No human intervention is required.

Figure 11:
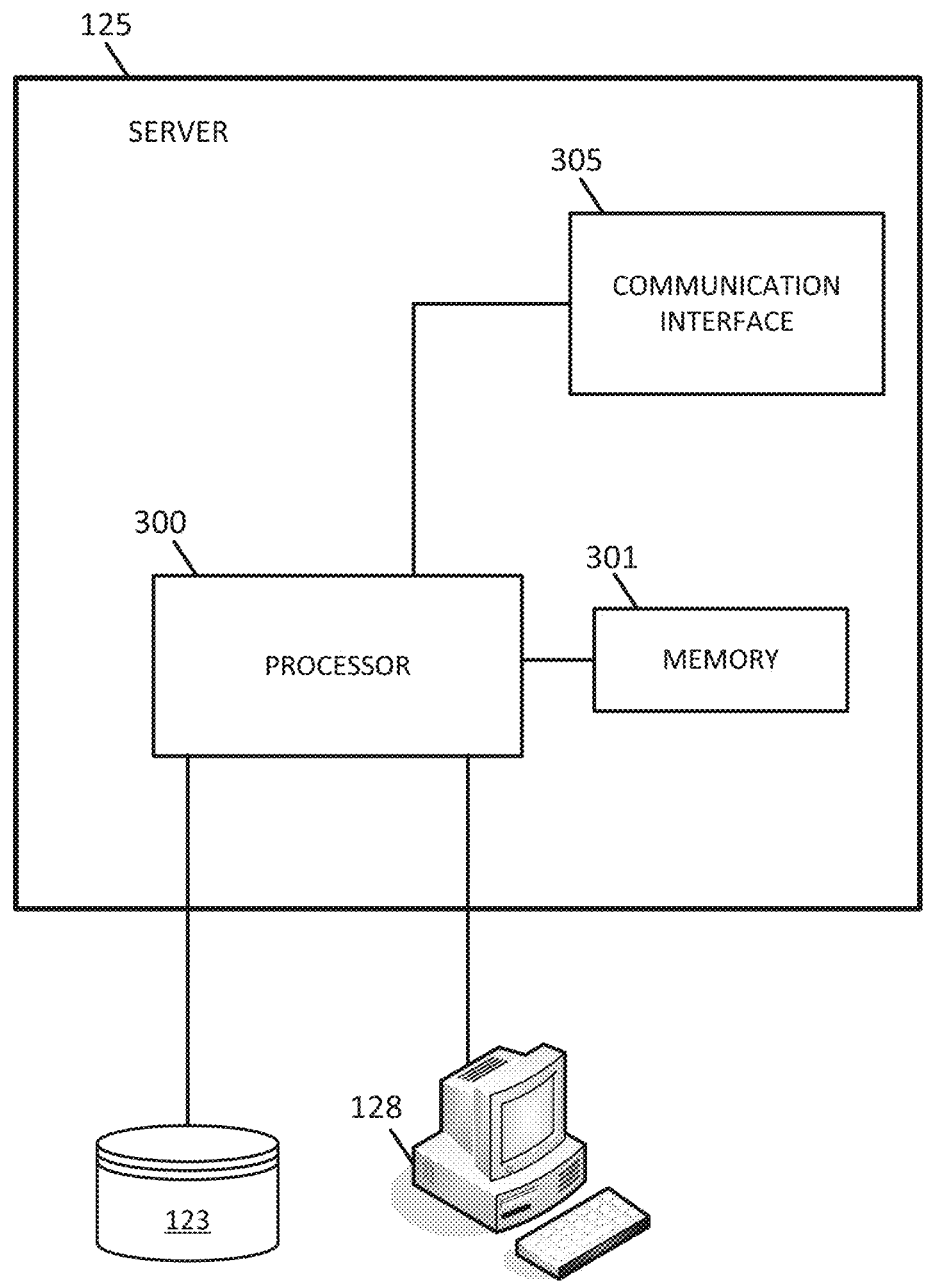
FIG. 11 illustrates an example server for the system of FIG. 1.

FIG. 11 illustrates an example server implementation of the sign detection controller 121. FIG. 11 illustrates an example server 125, which may apply to the system of FIG. 1. The server 125 includes a processor 300, a communication interface 305, a memory 301, and a database 123. An input device (e.g., keyboard or personal computer 128) may be used to enter settings to the server 125. The settings may include settings for thresholds and other user preferences described herein. Additional, different, or fewer components may be provided in the server 125.

Figure 12:
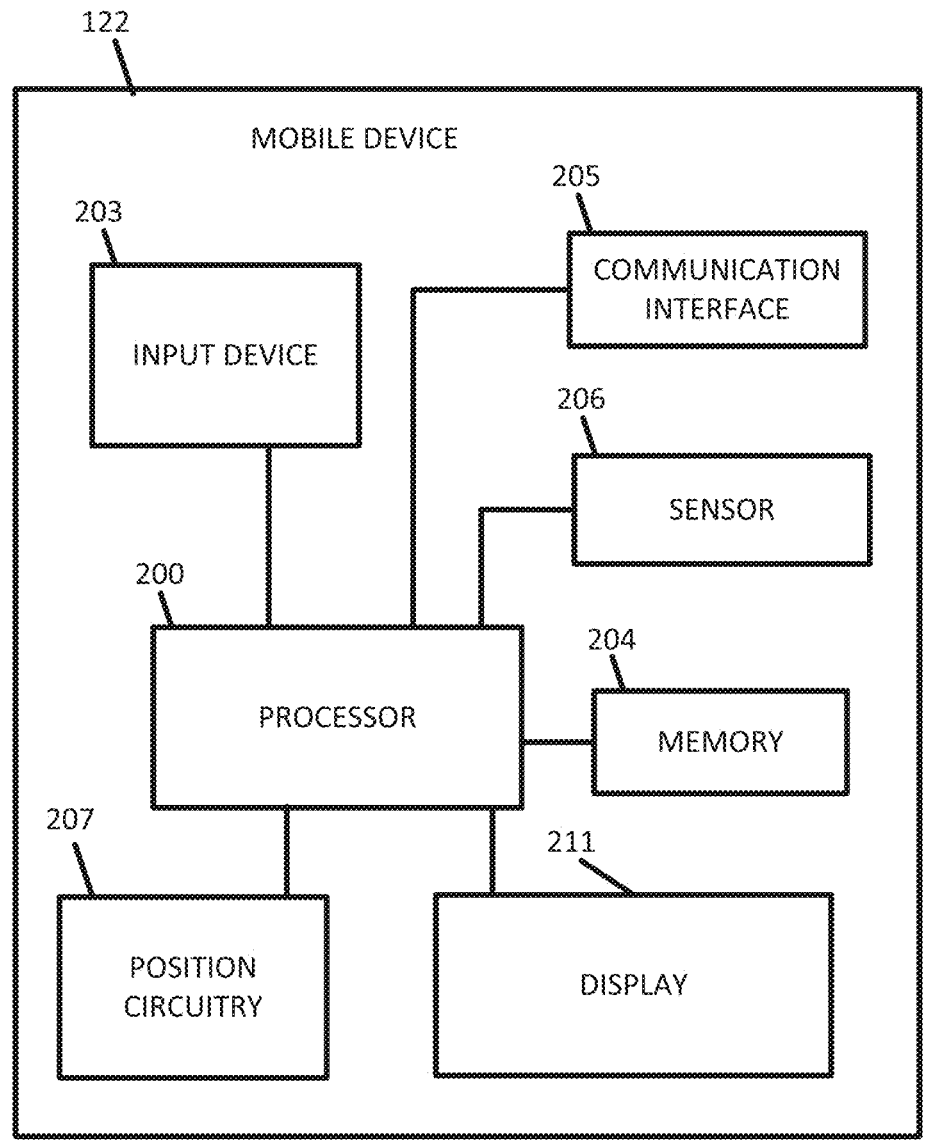
FIG. 12 illustrates an example mobile device for the system of FIG. 1.

FIG. 12 illustrates an example mobile device implementation of the sign detection controller 121. FIG. 12 illustrates an exemplary mobile device 122 of the system of FIG. 1. The mobile device 122 includes a processor 200, a memory 204, an input device 203, a communication interface 205, position circuitry 207, a display 211, and a sensor array 206. The sensor 206 may include a camera or another imaging device. The sensor array 206 may include LiDAR or another distance based point cloud device as well as a camera or another image collection device. The input device 203 may receive commands from the user for default settings for the sign classification techniques. The default settings may include the distance values for staleness and maturity, thresholds for convergence values, thresholds for parsimony values, and thresholds for the focal overlap values.

The processor 200 may communicate with a vehicle ECU (vehicle controller) which operates one or more driving mechanisms (e.g., accelerator, brakes, steering device). When the sign classification includes a speed limit or other warning, the vehicle controller may operate one or more driving mechanisms in response to the sign classification. Alternatively, the mobile device 122 may be the vehicle ECU, which operates the one or more driving mechanisms directly. Additional, different, or fewer components are possible for the mobile device 122.

Figure 13:
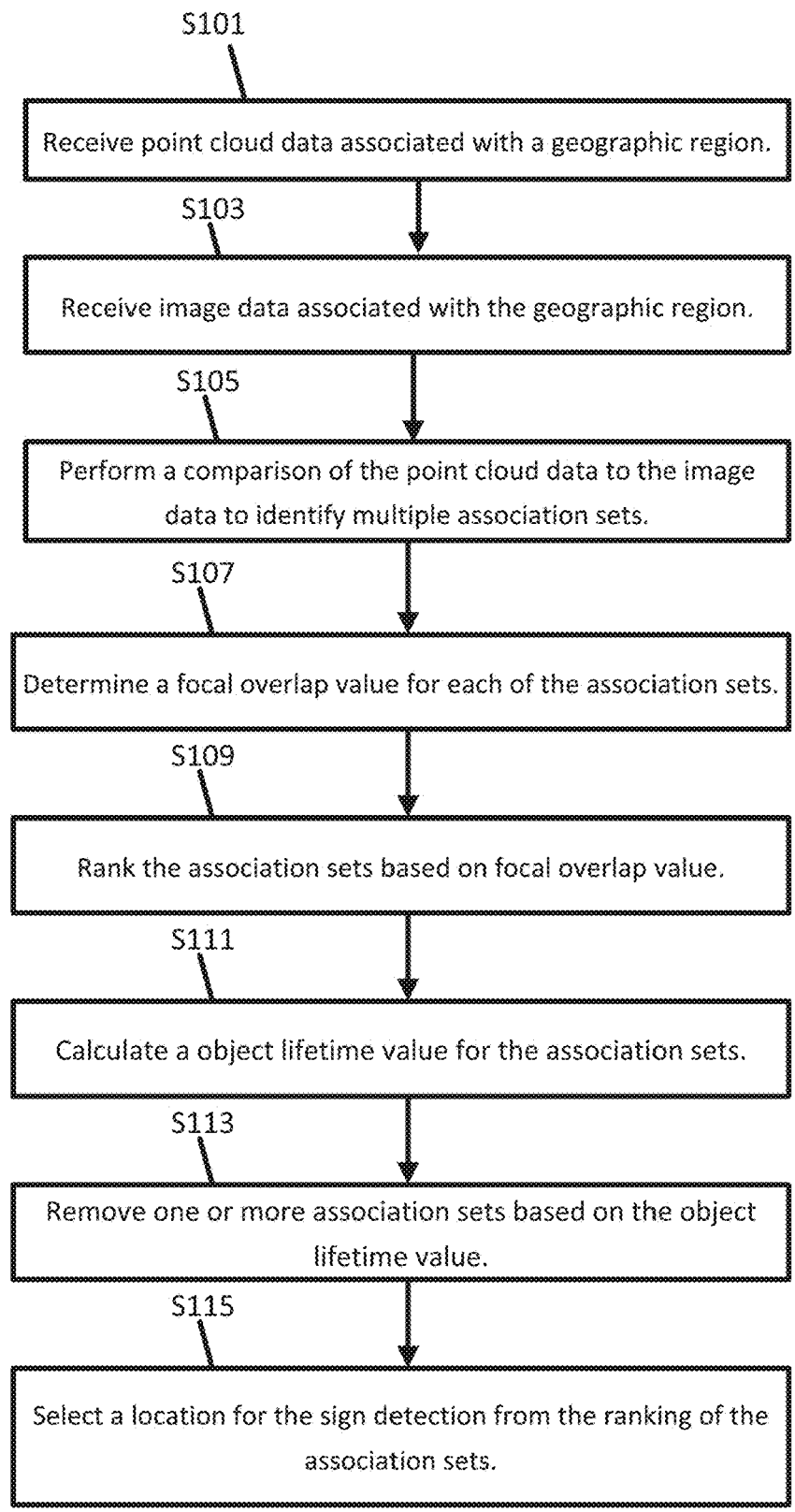
FIG. 13 illustrates an example flow chart for the operations of the server and/or the mobile device.

FIG. 13 illustrates an example flow chart for the operations of the server and/or the mobile device. Additional, different, or fewer acts may be provided. Either the mobile device 122 or the server 125 performs the acts of FIG. 13. The resulting object classifications may be provided back to the mobile device 122 or other mobile devices 122 for the location based service.

At act S101, the communication interface 205 or communication interface 305 receives point cloud data associated with a geographic region. Alternatively, the distance data sensor of the sensory array 206 receives the point cloud data. The point cloud data is provided to the processor 200 or processor 300 in order to classify points in the point cloud. In one example, the point cloud is analyzed in groups or neighborhoods. The size of the neighborhood may be increased until a classification may be made. Example classifications may include linear, planar, or volumetric. The processor may identify neighborhoods having a specific classification, such as planar, as being sign candidates. The communication device or the sensor are example means for receiving the point cloud data.

At act S103, the communication interface 205 or communication interface 305 receives image data associated with a geographic region. Alternatively, the camera or image sensor of the sensory array 206 receives the image data. The processor 200 or processor 300 calculates a sighting frustum from the image data. Properties such as the perspective of the camera and/or focal range of the camera may be accessed from memory. The sighting frustum is determined from the properties of the camera. The communication device or the sensor are example means for receiving the image data.

At act S105, the processor 200 or the processor 300 performs a comparison of the point cloud data to the image data to identify association sets. In one example, the sign candidates from the point cloud are compared to the frustum derived from the image. The frustum includes three dimensional coordinates derived from the properties of the camera. The sign candidates have three dimensional coordinates derived from the classification of the point cloud. The processor 200 or the processor 300 determines whether the coordinates of the sign candidates indicate an overlapping space or plane with the coordinates of the frustum. The processor is a specialized processor or includes a module as is an example means for comparing the point cloud data to the image data to identify association sets.

At act S107, the processor 200 or the processor 300 determines a focal overlap value for each of the association sets. The focal overlap may indicate a degree of overlap of the coordinates of the sign candidates with the coordinates of the frustum. The focal overlap may be a percentage of an area for the overlap of the sign candidates with the frustum as compared to the entire sign candidate. The focal overlap may be a percentage of an area for the overlap of the sign candidates with the frustum as compared to the entire plane of the frustum. The processor is a specialized processor or includes a module as an example means for determining a focal overlap value for each of the plurality of association sets.

At act S109, the processor 200 or the processor 300 ranks the association sets based on focal overlap value. The processor may sort the association sets according to the numerical representation of the focal overlap value. The focal overlap values may be sorted in an index stored in memory 204 or 301. The processor may select the highest value, or a subset of the higher values, from the ranked list of focal overlap values. The processor is a specialized processor or includes a module as means for ranking the association sets based on focal overlap value.

At act S111, the processor 200 or the processor 300 calculates an object lifetime value for the plurality of association sets. The object lifetime value may be a numerical value that represents the distance traveled since the data for the frustum or the sign candidate were first collected by the sensor array 206. When the distance reaches a threshold distance, the object lifetime value is a predetermined value. The processor is a specialized processor or includes a module as means for calculating an object lifetime value for the plurality of association sets.

At act S113, the processor 200 or the processor 300 removes one or more association sets in response to the object lifetime value. The association sets with object lifetime values below a threshold may be deleted from memory. The processor is a specialized processor or includes a module as means for removing one or more association sets in response to the object lifetime value. The object lifetime value may be an indication of the confidence in the association set. The object lifetime value may depend on whether additional data may be collected that impacts the association set.

After association sets have been removed based on the object lifetime value, the processor 200 or the processor 300 may repeat act S109 and re-rank the remaining association sets according to the focal overlap values.

At act S115, the processor 200 or the processor 300 selects a location for the sign detection from the ranking of the association sets. The detection of the sign location is the coordinates that correspond to the overlap of the sign candidate position and the frustum. The processor is a specialized processor or includes a module as means for selecting a location for the sign detection from the ranking of the association sets. The processor 200 or the processor 300 classifies the detected sign according to sign type.

In one example, the acts of FIG. 13 are performed for a drive of vehicle 124. When the drive ends, all remaining association sets are processed regardless of lifetime object values for a predetermined distance. That is, for the last predetermined distance of the drive, acts S111 and S113 are omitted. In this way, signs are detected in the last section of the drive even if more accurate data could have been collected downstream of the end of the driver.

The mobile device 122 may be a personal navigation device ("PND"), a portable navigation device, a mobile phone, a personal digital assistant ("PDA"), a watch, a tablet computer, a notebook computer, and/or any other known or later developed mobile device or personal computer. The mobile device 122 may also be an automobile head unit, infotainment system, and/or any other known or later developed automotive navigation system. Non-limiting embodiments of navigation devices may also include relational database service devices, mobile phone devices, car navigation devices, and navigation devices used for air or water travel.

The geographic database 123 may include map data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the map data. The map data may include structured cartographic data or pedestrian routes. The map data may include map features that describe the attributes of the roads and intersections.

The geometric features may include curvature, slope, or other features. The curvature of a road segment describes a radius of a circle that in part would have the same path as the road segment. The slope of a road segment describes the difference between the starting elevation and ending elevation of the road segment. The slope of the road segment may be described as the rise over the run or as an angle.

The restrictions for traveling the roads or intersections may include turn restrictions, travel direction restrictions, speed limits, lane travel restrictions or other restrictions. Turn restrictions define when a road segment may be traversed onto another adjacent road segment. For example, when a node includes a "no left turn" restriction, vehicles are prohibited from turning left from one road segment to an adjacent road segment. Turn restrictions may also restrict that travel from a particular lane through a node. For example, a left turn lane may be designated so that only left turns (and not traveling straight or turning right) is permitted from the left turn late. Another example of a turn restriction is a "no U-turn" restriction.

Travel direction restriction designate the direction of travel on a road segment or a lane of the road segment. The travel direction restriction may designate a cardinal direction (e.g., north, southwest, etc.) or may designate a direction from one node to another node. The roadway features may include the number of lanes, the width of the lanes, the functional classification of the road, or other features that describe the road represented by the road segment. The functional classifications of roads may include different levels accessibility and speed. An arterial road has low accessibility but is the fastest mode of travel between two points. Arterial roads are typically used for long distance travel. Collector roads connect arterial roads to local roads. Collector roads are more accessible and slower than arterial roads. Local roads are accessible to individual homes and business. Local roads are the most accessible and slowest type of road.

Figure 14:
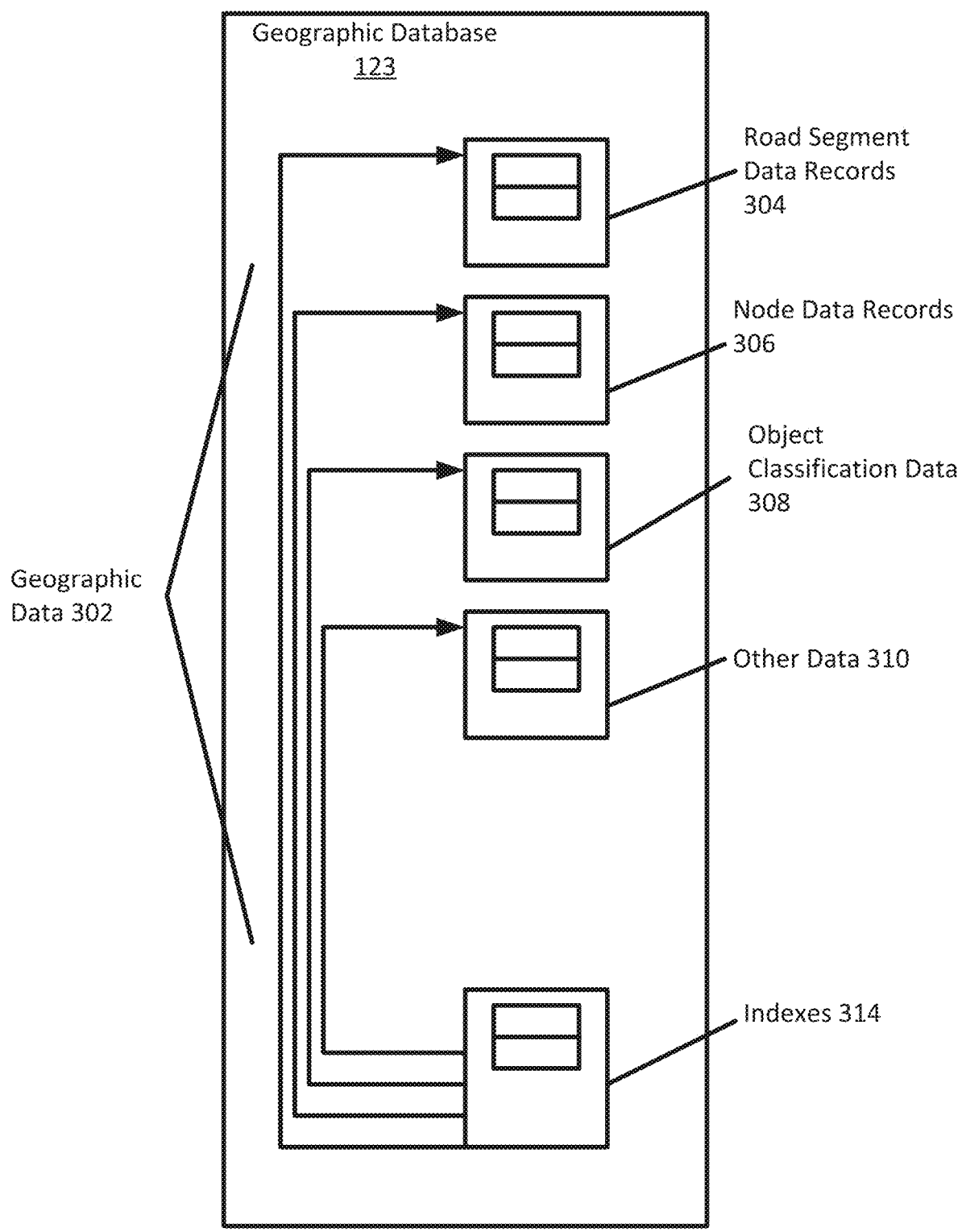
FIGS. 14 and 15 illustrate example geographic databases.

In FIG. 14, the geographic database 123 may contain at least one road segment database record 304 (also referred to as "entity" or "entry") for each road segment in a particular geographic region. The geographic database 123 may also include a node database record 306 (or "entity" or "entry") for each node in a particular geographic region. The terms "nodes" and "segments" represent only one terminology for describing these physical geographic features, and other terminology for describing these features is intended to be encompassed within the scope of these concepts. The geographic database 123 may also include location fingerprint data for specific locations in a particular geographic region.

The geographic database 123 may include other kinds of data 310. The other kinds of data 310 may represent other kinds of geographic features or anything else. The other kinds of data may include POI data. For example, the POI data may include POI records comprising a type (e.g., the type of POI, such as restaurant, hotel, city hall, police station, historical marker, ATM, golf course, etc.), location of the POI, a phone number, hours of operation, etc.

The geographic database 123 also includes indexes 314. The indexes 314 may include various types of indexes that relate the different types of data to each other or that relate to other aspects of the data contained in the geographic database 123. For example, the indexes 314 may relate the nodes in the node data records 306 with the end points of a road segment in the road segment data records 304.

As another example, the indexes 314 may relate object classification data 308 (e.g., for a sign) with a road segment in the segment data records 304 or a geographic coordinate. An index 314 may, for example, store object classification data 308 relating to one or more signs that have been identified.

The geographic database 123 may also include other attributes of or about roads such as, for example, geographic coordinates, physical geographic features (e.g., lakes, rivers, railroads, municipalities, etc.) street names, address ranges, speed limits, turn restrictions at intersections, and/or other navigation related attributes (e.g., one or more of the road segments is part of a highway or toll way, the location of stop signs and/or stoplights along the road segments), as well as POIs. The geographic database 123 may also contain one or more node data record(s) 306 which may be associated with attributes (e.g., about the intersections) such as, for example, geographic coordinates, street names, address ranges, speed limits, turn restrictions at intersections, and other navigation related attributes, as well as POIs. The geographic data 302 may additionally or alternatively include other data records such as, for example, POI data records, topographical data records, cartographic data records, routing data, and maneuver data. Other contents of the database 123 may include temperature, altitude or elevation, lighting, sound or noise level, humidity, atmospheric pressure, wind speed, the presence of magnetic fields, electromagnetic interference, or radio- and micro-waves, cell tower and wi-fi information, such as available cell tower and wi-fi access points, and attributes pertaining to specific approaches to a specific location.

The geographic database 123 may include historical traffic speed data for one or more road segments. The geographic database 123 may also include traffic attributes for one or more road segments. A traffic attribute may indicate that a road segment has a high probability of traffic congestion.

Figure 15:
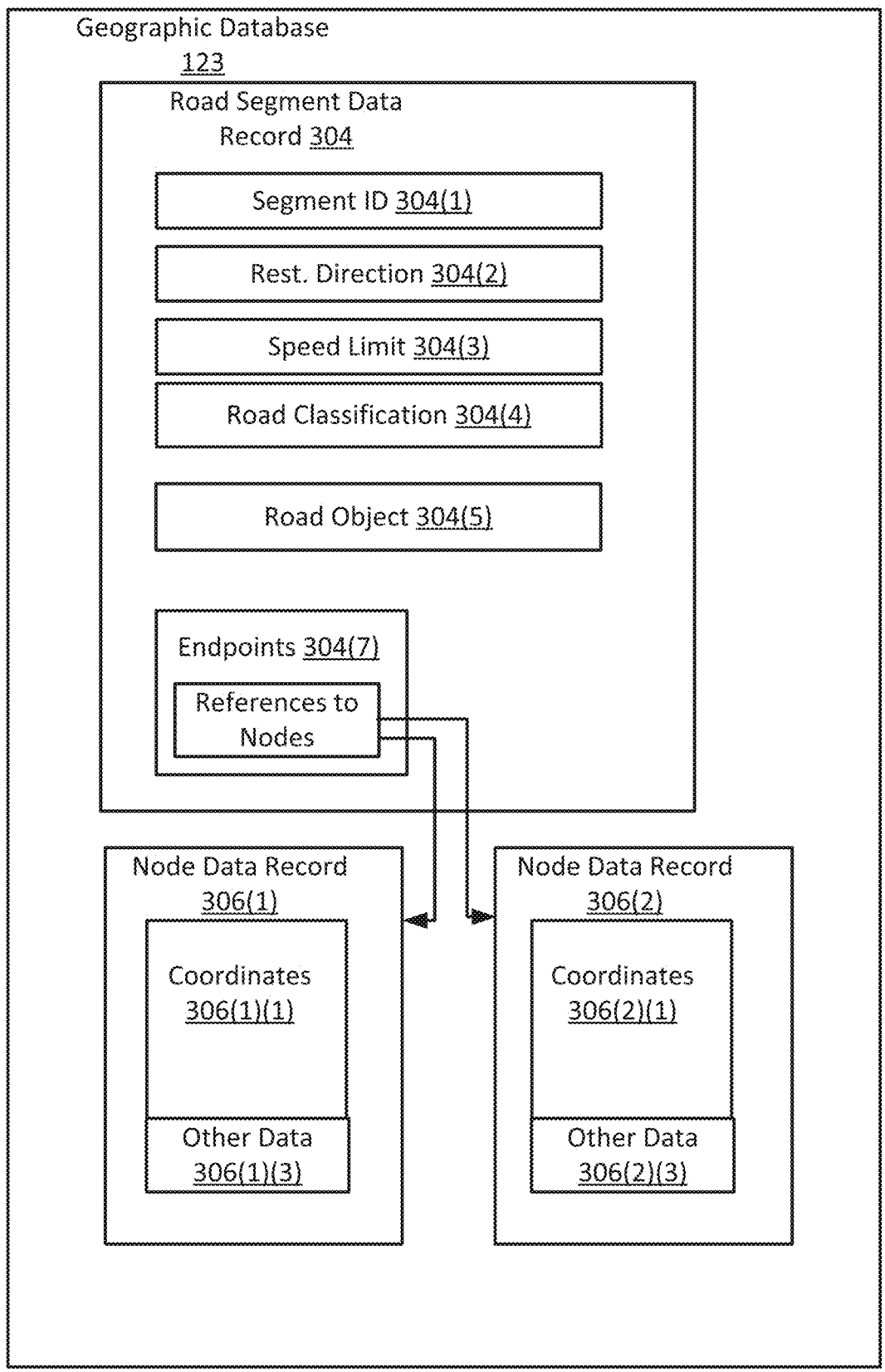

FIG. 15 shows some of the components of a road segment data record 304 contained in the geographic database 123 according to one embodiment. The road segment data record 304 may include a segment ID 304(1) by which the data record can be identified in the geographic database 123. Each road segment data record 304 may have associated with it information (such as "attributes", "fields", etc.) that describes features of the represented road segment. The road segment data record 304 may include data 304(2) that indicate the restrictions, if any, on the direction of vehicular travel permitted on the represented road segment. The road segment data record 304 may include data 304(3) that indicate a speed limit or speed category (i.e., the maximum permitted vehicular speed of travel) on the represented road segment. The road segment data record 304 may also include classification data 304(4) indicating whether the represented road segment is part of a controlled access road (such as an expressway), a ramp to a controlled access road, a bridge, a tunnel, a toll road, a ferry, and so on. The road segment data record may include location fingerprint data, for example a set of sensor data for a particular location.

The geographic database 123 may include road segment data records 304 (or data entities) that describe features such as road objects 304(5). The road objects 304(5) may be stored according to location boundaries or vertices. The road objects 304(5) may be stored as a field or record using a scale of values such as from 1 to 100 for type or size.

The road objects may be objects in the road or in the vicinity of the road. The road objects may be stored with a classification field according to the object classifications calculated from the neural network pipeline. Example object classifications are provided in Table 1. Additional schema may be used to describe the road objects. The attribute data may be stored in relation to a link/segment 304, a node 306, a strand of links, a location fingerprint, an area, or a region. The geographic database 123 may store information or settings for display preferences. The geographic database 123 may be coupled to a display. The display may be configured to display the roadway network and data entities using different colors or schemes.

The road segment data record 304 also includes data 304(7) providing the geographic coordinates (e.g., the latitude and longitude) of the end points of the represented road segment. In one embodiment, the data 304(7) are references to the node data records 306 that represent the nodes corresponding to the end points of the represented road segment.

The road segment data record 304 may also include or be associated with other data 304(7) that refer to various other attributes of the represented road segment. The various attributes associated with a road segment may be included in a single road segment record or may be included in more than one type of record which cross-references to each other. For example, the road segment data record 304 may include data identifying what turn restrictions exist at each of the nodes which correspond to intersections at the ends of the road portion represented by the road segment, the name, or names by which the represented road segment is identified, the street address ranges along the represented road segment, and so on.

FIG. 15 also shows some of the components of a node data record 306 that may be contained in the geographic database 123. Each of the node data records 306 may have associated information (such as "attributes", "fields", etc.) that allows identification of the road segment(s) that connect to it and/or its geographic position (e.g., its latitude and longitude coordinates). The node data records 306(1) and 306(2) include the latitude and longitude coordinates 306(1)(1) and 306(2)(1) for their node. The node data records 306(1) and 306(2) may also include other data 306(1)(3) and 306(2)(3) that refer to various other attributes of the nodes.

The geographic database 123 may be maintained by a content provider (e.g., a map developer). By way of example, the map developer may collect geographic data to generate and enhance the geographic database 123. The map developer may obtain data from sources, such as businesses, municipalities, or respective geographic authorities. In addition, the map developer may employ field personnel to travel throughout a geographic region to observe features and/or record information about the roadway. Remote sensing, such as aerial or satellite photography, may be used. The database 123 may be incorporated in or connected to the server 125.

The geographic database 123 and the data stored within the geographic database 123 may be licensed or delivered on-demand. Other navigational services or traffic server providers may access the location fingerprint data, traffic data and/or the lane line object data stored in the geographic database 123.

The processor 200 and/or processor 300 may include a general processor, digital signal processor, an application specific integrated circuit (ASIC), field programmable gate array (FPGA), analog circuit, digital circuit, combinations thereof, or other now known or later developed processor. The processor 200 and/or processor 300 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 801 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The databases 123 may include geographic data used for traffic and/or navigation-related applications. The geographic data may include data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the geographic data. The geographic data may include structured cartographic data or pedestrian routes.

The databases may also include other attributes of or about the roads such as, for example, geographic coordinates, street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The databases may also contain one or more node data record(s) which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

The databases may include historical traffic speed data for one or more road segments. The databases may also include traffic attributes for one or more road segments. A traffic attribute may indicate that a road segment has a high probability of traffic congestion.

The input device 203 may be one or more buttons, keypad, keyboard, mouse, stylus pen, trackball, rocker switch, touch pad, voice recognition circuit, or other device or component for inputting data to the mobile device 122. The input device 203 and display 211 may be combined as a touch screen, which may be capacitive or resistive. The display 211 may be a liquid crystal display (LCD) panel, light emitting diode (LED) screen, thin film transistor screen, or another type of display. The output interface of the display 211 may also include audio capabilities, or speakers.

In an embodiment, the input device 203 may involve a device having velocity detecting abilities.

The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

The position circuitry 207 may also include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a vehicle may be considered a mobile device, or the mobile device may be integrated into a vehicle.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any one or more of a computer-readable medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The following example embodiments are also disclosed:

Embodiment 1

A method for sign detection in a three-dimensional point cloud and a two-dimensional image, the method further comprising:
receiving point cloud data associated with a geographic region;
classifying at least one point neighborhood in the point cloud data as linear, planar, or volumetric;
selecting at least one point neighborhood classified as planar as a sign position candidate;
receiving image data associated with the geographic region;
calculating a sighting frustum from the image data;
performing a comparison of the sighting frustum to the sign position candidate having at least one point neighborhood classified as planar; and
providing a location for the sign detection in response to the comparison.

Embodiment 2

The method of embodiment 1, wherein the sighting frustum is calculated based on a location of an image sensor that collected the image data associated with the geographic region.

Embodiment 3

The method of embodiment 1 or 2, further comprising:
receiving location data for a vehicle associated with the image sensor, wherein the sighting frustum is calculated based on the location data for the vehicle.

Embodiment 4

The method of any of embodiments 1 to 3, further comprising:
identifying a plurality of locations for sign detection in response to the comparison.

Embodiment 5

The method of any of embodiments 1 to 4, further comprising:
calculating an intersection of the at least one point neighborhood and the sighting frustum.

Embodiment 6

The method of any of embodiments 1 to 5, further comprising:
calculating a coverage value for the intersection of the at least one point neighborhood and the sighting frustum.

Embodiment 7

The method of any of embodiments 1 to 6, wherein the coverage value (CV) is calculated based on an area of an intersection $A(S \cap C)$ of the at least one point neighborhood and the sighting frustum and the area of the at least one point neighborhood $A(C)$ according to $$CV = \frac{A(S \cap C)}{A(C)}.$$

Embodiment 8

The method of any of embodiments 1 to 7, further comprising:
calculating a parsimony value for the intersection of the at least one point neighborhood and the sighting frustum.

Embodiment 9

The method of any of embodiments 1 to 8, wherein the parsimony value (PV) is calculated based on an area of an intersection $A(S \cap C)$ of the at least one point neighborhood and the sighting frustum and the area of the sighting frustum $A(S)$ according to $$PV = \frac{A(S \cap C)}{A(S)}.$$

Embodiment 10

The method of any of embodiments 1 to 9, further comprising:
calculating a coverage value for the intersection of the at least one point neighborhood and the sighting frustum;
calculating a parsimony value for the intersection of the at least one point neighborhood and the sighting frustum; and
determining a focal overlap value as a minimum value between the coverage value and the parsimony value.

Embodiment 11

The method of any of embodiments 1 to 10, wherein multiple focal overlap values are determined between a plurality of point neighborhood and the sighting frustum, the method further comprising:
ranking the multiple focal overlap values according an ascending order; and selecting a highest focal overlap value from the ranked multiple focal overlap values.

Embodiment 12

The method of any of embodiments 1 to 11, further comprising:
removing at least one other sign detection associated with the sighting frustum.

Embodiment 13

The method of any of embodiments 1 to 12, further comprising:
providing the sign detection to a vehicle controller.

Embodiment 14

The method of any of embodiments 1 to 13, further comprising:
providing the sign detection to a geographic database.

Embodiment 15

An apparatus, configured to perform and/or control the method of any of embodiments 1-14 or comprising means for performing and/or controlling any of embodiments 1-14.

Embodiment 16

An apparatus, comprising at least one processor and at least one memory including computer program code for one or more programs, the at least one memory and the computer program code configured to, with the at least one processor, to perform and/or control the method of any of embodiments 1-14.

Embodiment 17

A computer program comprising instructions operable to cause a processor to perform and/or control the method of any of embodiments 1-14, when the computer program is executed on the processor.

We claim:
1. A method for sign detection comprising:
receiving point cloud data associated with multiple locations in a geographic region as a vehicle travels along a path;
calculating a sign position candidate for the point cloud data;
receiving image data associated with the geographic region;
calculating a sighting frustum from the image data;
performing a comparison of the sighting frustum to the sign position candidate to identify a plurality of association sets;
removing one or more association sets so as to select an accurate association set; and
storing a sign location in a geographic database in response to the selected accurate association set comparison.
2. The method of claim 1, wherein the point cloud data includes a first point cloud for a first location and a second point cloud for a second location.
3. The method of claim 2, further comprising:
updating the sign position candidate from a first sign position candidate based on the first point cloud to a second sign position candidate based on the second point cloud.
4. The method of claim 2, wherein the comparison of the sighting frustum to the sign position candidate is repeated for the second point cloud and the second location.
5. The method of claim 1, wherein the sighting frustum is a pyramidal region.
6. The method of claim 5, wherein the sighting frustum is clipped based on a focal length range of an image sensor that collected the image data.
7. The method of claim 6, wherein the focal length range includes a first focal length and a second focal length.
8. The method of claim 1, wherein the sighting frustum is a conical region.
9. The method of claim 8, wherein the sighting frustum is defined according to at least one point for a near plane and at least one point for a far plane.
10. The method of claim 1, wherein calculating a sign position candidate for the point cloud data further comprises:
classifying a region in the point cloud data.
11. The method of claim 1, wherein the comparison of the sighting frustum to the sign position candidate comprises:
calculating a coverage value for an intersection of the sighting frustum to the sign position candidate.
12. The method of claim 11, further comprising:
calculating a parsimony value for the intersection of the sighting frustum to the sign position candidate.
13. The method of claim 12, further comprising:
determining a focal overlap value as a minimum value between the coverage value and the parsimony value.
14. A non-transitory computer readable medium including instructions that when executed by a processor are configured to perform:
receiving point cloud data associated with multiple locations in a geographic region as a vehicle travels along a path;
calculating a sign position candidate for the point cloud data;
receiving image data associated with the geographic region;
calculating a sighting frustum from the image data;
performing a comparison of the sighting frustum to the sign position candidate to identify a plurality of association sets;
calculating a coverage value for an intersection of the sighting frustum to the sign position candidate to remove one or more association sets of the plurality of association sets;
calculating a parsimony value for the intersection of the sighting frustum to the sign position candidate to remove one or more association sets of the plurality of association sets; and
storing a sign location in a geographic database in response to the coverage value and the parsimony value.
15. An apparatus for sign detection in a three-dimensional point cloud and a two-dimensional image, the apparatus comprising:
a memory configured to store instructions; and
a processor configured to execute the instructions to perform:
receiving point cloud data associated with multiple locations in a geographic region as a vehicle travels along a path;

calculating a sign position candidate for the point cloud data;

receiving image data associated with the geographic region;

calculating a sighting frustum from the image data;

performing a comparison of the sighting frustum to the sign position candidate to identify a plurality of association sets;

removing one or more association sets so as to select an accurate association set; and storing, in the memory, a sign location in a geographic database in response to the selected accurate association set comparison.

16. The apparatus of claim 15, wherein the point cloud data includes a first point cloud for a first location and a second point cloud for a second location.

17. The apparatus of claim 16, processor configured to execute the instructions to perform:

updating the sign position candidate from a first sign position candidate based on the first point cloud to a second sign position candidate based on the second point cloud.

18. The apparatus of claim 17, wherein the comparison of the sighting frustum to the sign position candidate is repeated for the second point cloud and the second location.

19. The apparatus of claim 17, wherein the sighting frustum is a pyramidal region or a conical region.

20. The apparatus of claim 17, wherein the sighting frustum is defined according to at least one point for a near plane and at least one point for a far plane.

\* \* \* \* \*